(12) United States Patent
Speier

(10) Patent No.: US 10,902,042 B2
(45) Date of Patent: Jan. 26, 2021

(54) PATENT CLAIM REFERENCE GENERATION

(71) Applicant: Gary J. Speier, Eden Prairie, MN (US)

(72) Inventor: Gary J. Speier, Eden Prairie, MN (US)

(*) Notice: Subject to any disclaimer, the term of this patent is extended or adjusted under 35 U.S.C. 154(b) by 890 days.

(21) Appl. No.: 14/733,387

(22) Filed: Jun. 8, 2015

(65) Prior Publication Data

US 2015/0278349 A1 Oct. 1, 2015

Related U.S. Application Data

(63) Continuation of application No. 11/759,620, filed on Jun. 7, 2007, now abandoned.

(Continued)

(51) Int. Cl.
*G06F 16/00* (2019.01)
*G06F 16/33* (2019.01)
(Continued)

(52) U.S. Cl.
CPC ........ *G06F 16/3349* (2019.01); *G06F 3/0482* (2013.01); *G06F 16/334* (2019.01); *G06F 16/93* (2019.01); *G06F 16/94* (2019.01); *G06F 16/957* (2019.01); *G06Q 10/06* (2013.01); *G06Q 10/10* (2013.01); *G06Q 50/184* (2013.01); *H04L 41/22* (2013.01); *G06F 2216/11* (2013.01)

(58) Field of Classification Search
CPC ......... G06F 17/30011; G06F 17/30669; G06F 17/30445; G06F 17/2705; G06F 17/3061; G06F 17/30398; G06F 17/30864; G06F 17/30728; G06F 17/30616; G06F 16/14; G06F 16/148; G06F 16/25; G06F 16/248; G06F 16/44; G06F 16/3349; G06F 16/334; G06F 16/93–94; G06F 16/957; G06F 2216/11; G06Q 10/06; G06Q 10/10; G06Q 50/184; H04L 41/22
See application file for complete search history.

(56) References Cited

U.S. PATENT DOCUMENTS 5,754,840 A 5/1998 Rivette et al.
5,774,833 A 6/1998 Newman
(Continued)

OTHER PUBLICATIONS

"U.S. Appl. No. 11/750,620, Pre-Appeal Brief Request filed Sep. 26, 2011", 4 pgs.
(Continued)

*Primary Examiner* — Srirama Channavajjala
(74) *Attorney, Agent, or Firm* — Schwegman Lundberg & Woessner, P.A.

(57) ABSTRACT

In one embodiment, a method is illustrated as including receiving a search query, the search query relating to a patent, retrieving data relating to a term contained in a claim limitation in the patent, the data including at least one of intrinsic or extrinsic evidence associated with the term by a hyperlink, and displaying the claim limitation and the hyperlink. Further, a computer system is illustrated as including a receiver to receive a search query, the search query relating to a patent, a retriever to retrieve data relating to a term contained in a claim limitation in the patent, the data including at least one of intrinsic or extrinsic evidence associated with the term by a hyperlink, and a display to display the claim limitation and the hyperlink.

20 Claims, 22 Drawing Sheets

Related U.S. Application Data

(60) Provisional application No. 60/883,471, filed on Jan. 4, 2007, provisional application No. 60/829,718, filed on Oct. 17, 2006, provisional application No. 60/804,143, filed on Jun. 7, 2006.

(51) Int. Cl.

| | | |
|---|---|---|
| *G06Q 50/18* | (2012.01) | |
| *G06Q 10/10* | (2012.01) | |
| *G06F 16/93* | (2019.01) | |
| *G06F 16/957* | (2019.01) | |
| *H04L 12/24* | (2006.01) | |
| *G06Q 10/06* | (2012.01) | |
| *G06F 3/0482* | (2013.01) | |

(56) References Cited

U.S. PATENT DOCUMENTS

| | | | |
|---|---|---|---|
| 5,991,780 A | 11/1999 | Rivette et al. | |
| 6,014,680 A | 1/2000 | Sato et al. | |
| 6,038,561 A * | 3/2000 | Snyder | G06F 16/34 |
| 6,339,767 B1 * | 1/2002 | Rivette | G06F 16/34 |
| | | | 707/781 |
| 6,442,549 B1 | 8/2002 | Schneider | |
| 6,571,241 B1 * | 5/2003 | Nosohara | G06F 17/30669 |
| 6,591,261 B1 * | 7/2003 | Arthurs | G06F 16/951 |
| 6,604,114 B1 | 8/2003 | Toong et al. | |
| 6,662,178 B2 * | 12/2003 | Lee | G06Q 10/10 |
| 6,694,331 B2 | 2/2004 | Lee | |
| 6,834,276 B1 * | 12/2004 | Jensen | G06F 16/9558 |
| 7,080,067 B2 | 7/2006 | Nonomura et al. | |
| 7,131,069 B1 * | 10/2006 | Rush | G06F 3/0482 |
| | | | 715/738 |
| 7,194,691 B1 | 3/2007 | Zilka et al. | |
| 2002/0065677 A1 | 5/2002 | Grainger et al. | |
| 2002/0184254 A1 * | 12/2002 | Williams | G06F 17/30445 |
| 2003/0061243 A1 * | 3/2003 | Kim | G06F 17/3061 |
| 2003/0195871 A1 | 10/2003 | Luo et al. | |
| 2004/0078365 A1 * | 4/2004 | Poltorak | G06F 17/2705 |
| 2004/0133566 A1 | 7/2004 | Ishiguro et al. | |
| 2004/0181427 A1 | 9/2004 | Stobbs et al. | |
| 2004/0230550 A1 * | 11/2004 | Simpson | G06F 17/2247 |
| 2005/0210009 A1 | 9/2005 | Tran | |
| 2006/0173903 A1 * | 8/2006 | Zimmerman | G06Q 10/10 |
| 2007/0233692 A1 * | 10/2007 | Lisa | G06F 3/04817 |
| 2007/0288256 A1 | 12/2007 | Speier | |
| 2008/0005103 A1 * | 1/2008 | Ratcliffe | G06Q 10/10 |
| 2008/0140606 A1 * | 6/2008 | Clark | G06F 16/951 |
| 2008/0195604 A1 * | 8/2008 | Sears | G06F 17/27 |
| 2009/0307577 A1 | 12/2009 | Lee et al. | |
| 2010/0180223 A1 | 7/2010 | Speier | |
| 2012/0284199 A1 * | 11/2012 | Lundberg | G06F 16/3344 |
| | | | 705/310 |

OTHER PUBLICATIONS

"U.S. Appl. No. 11/759,620 , Appeal Brief filed Feb. 27, 2012", 21 pgs.
"U.S. Appl. No. 11/759,620 Non-Final Office Action dated Aug. 3, 2010", 13 pgs.
"U.S. Appl. No. 11/759,620, Appeal Decision dated Feb. 6, 2015", 10 pgs.
"U.S. Appl. No. 11/759,620, Examiner's Answer dated Apr. 10, 2012", 12 pgs.
"U.S. Appl. No. 11/759,620, Final Office Action dated Jan. 26, 2010", 11 pgs.
"U.S. Appl. No. 11/759,620, Final Office Action dated Apr. 26, 2011", 14 pgs.
"U.S. Appl. No. 11/759,620, Non Final Office Action dated May 11, 2009", 10 pgs.
"U.S. Appl. No. 11/759,620, Response filed Feb. 3, 2011 to Non Final Office Action dated Aug. 3, 2010", 9 pgs.
"U.S. Appl. No. 11/759,620, Response filed Jul. 26, 2010 to Final Office Action dated Jan. 26, 2010", 9 pgs.
"U.S. Appl. No. 11/759,620, Response filed Oct. 13, 2009 to Non Final Office Action dated May 11, 2009", 11 pgs.
"U.S. Appl. No. 12/616,040, Final Office Action dated Jan. 4, 2013", 12 pgs.
"U.S. Appl. No. 12/616,040, Final Office Action dated Nov. 6, 2014", 15 pgs.
"U.S. Appl. No. 12/616,040, Non Final Office Action dated May 24, 2012", 10 pgs.
"U.S. Appl. No. 12/616,040, Non Final Office Action dated Dec. 16, 2013", 10 pgs.
"U.S. Appl. No. 12/616,040, Response filed Apr. 4, 2013 to Final Office Action dated Jan. 4, 2013", 9 pgs.
"U.S. Appl. No. 12/616,040, Response filed Jun. 16, 2014 to Non Final Office Action dated Dec. 16, 2013", 12 pgs.
"U.S. Appl. No. 12/616,040, Response filed Oct. 24, 2012 to Non Final Office Action dated May 24, 2012", 11 pgs.
"U.S. Appl. No. 60/703,413, filed Jul. 27, 2000", 56 pgs.
"EAST Text search Training", manual published by USPTO, (Jan. 2000), 1-149.
"Patent Mapping", U.S. Appl. No. 60/703,413, filed Jul. 25, 2005.
U.S. Appl. No. 11/759,620, filed Jun. 7, 2007, Patent Claim Reference Generation.
U.S. Appl. No. 12/616,040, filed Nov. 10, 2009, Patent Analytics System.

* cited by examiner

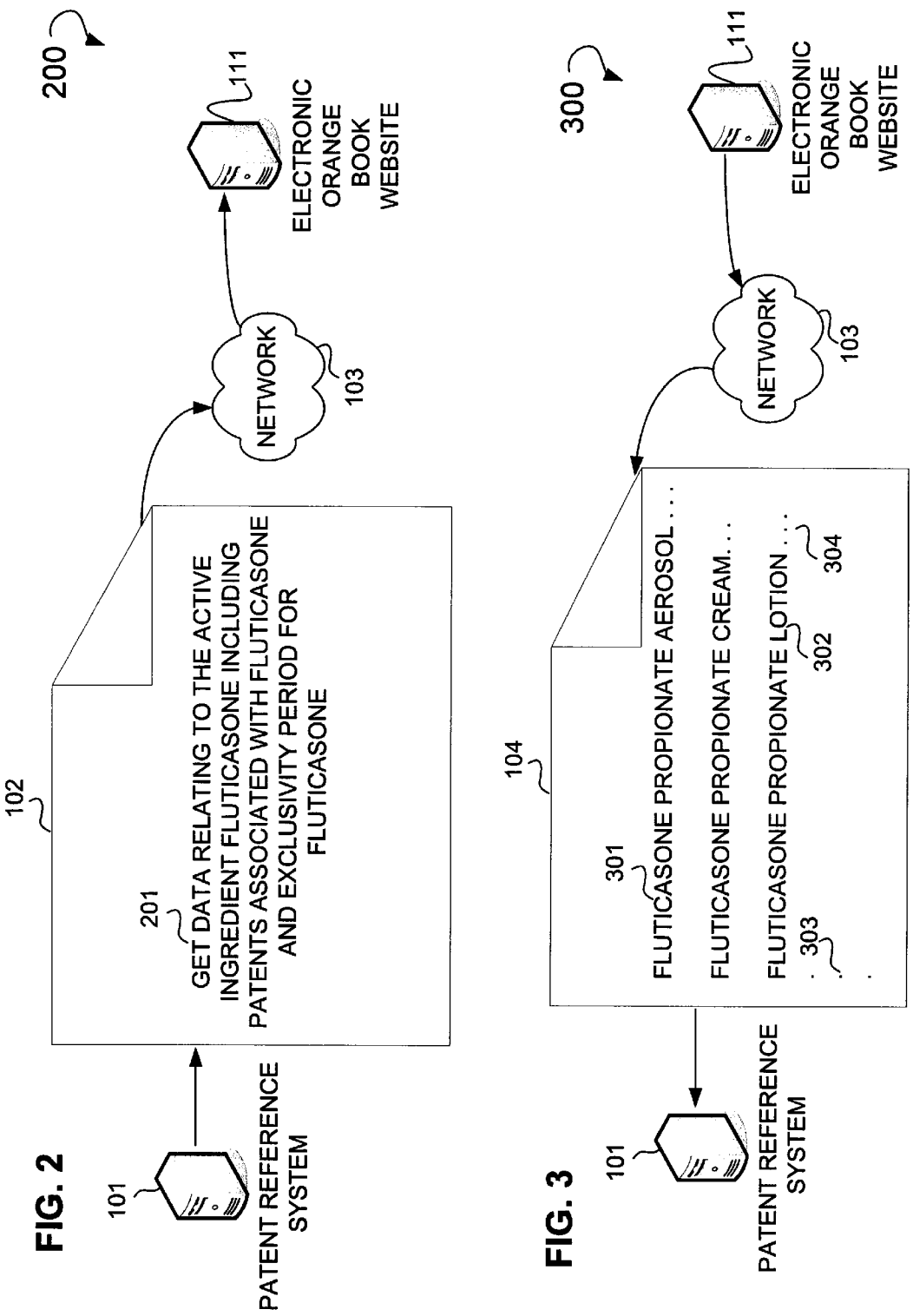

Patent No. 5,070,877     Novel Method of Myocardial Imaging
Mohiuddin, et al.
Issue Date: Nov. 11, 1999

Show claim version:
○ As filed (05-15-1989)
○ As of preliminary amendment (06-15-1989)
○ As of response (02-28-1991)
○ As of response (06-03-1991)
○ As of response (06-11-1991)
○ As of allowance (06-28-1991)
● At issue (11-05-1991)

Show marked up claims: ☐
Show intrinsic reference information: ☑
Show extrinsic reference information: ☑

CLAIMS:
           ┌─1100A           ┌─1100C

1. A method of <detecting the presence> and <assessing the severity> of <myocardial dysfunction> in <a human> comp
     └ 1100B (a) <administering> by an <intrav
to <about 200 mcg/kg/minute> of
<coronary artery dilation>; and (b) <performing> a technique on
severity> of said <myocardial dys 2. A method of <detecting the pre
dysfunction> in <a human> comp (a) <administering> by an <intrac
20 mcg> of an <adenosine recept
dilation>; and (b) <performing> a <technique>
the severity> of said <myocardial ⊟ Intrinsic Evidence
   ⊞ Prosecution History
   ⊞ Specification
   ⊟ References Listed on Cover Page
     ⊟ U.S. Patent Documents
       3,845,205, Oct. 1974, Maguire et al.    (MSWord) (PDF)
       4,663,313, May 1987, Bristol et al.    (MSWord) (PDF)
   1106A   4,673,563, June 1987, Berne et al.    (MSWord) (PDF)
       4,689,041, Aug.1987, Cordy et al.    (MSWord) (PDF)
       4,693,996, Sept. 1987, Steffen    (MSWord) (PDF)
   1106B   4,709,703, Dec. 1987, Lazarow et al.    (MSWord) (PDF)
       4,880,783, Nov. 1989, Mentzer et al.    (MSWord) (PDF)
     ⊟ Foreign Patent Documents
       0062921, Oct., 1982, EP    (MSWord) (PDF)
       2007273, Aug., 1971, DE    (MSWord) (PDF)
   1106C   WO83/02391, Jul., 1983, WO    (PDF)
       WO87/01593, Mar., 1987, WO    (PDF)
     ⊟ Other References
       Camici et al.    (MSWord)
       Pantely et al.    (MSWord)
⊟ Extrinsic Evidence
   ⊟ Search Results
     ⊟ U.S. Patents and Applications
       3,845,205, Maguire et al    (MSWord) (PDF)
     ⊞ International Patents and Applications
     ⊞ Non-Patent Literature      1108A   1108B
   ⊟ Technical Databases
     ⊞ FDA Drug Approval History
     ⊞ Mosby's Medical Dictionary
     ⊞ Merck Index
     ⊞ Physician's Drug Reference
     ⊞ RXList.com
     ⊞ CHMoogle.com

| Ref. No. | Ref. Cite | detecting the presence or assessing the severity of myocardial dysfunction or coronary artery disease (e.g., heart disease)? | administering adenosine receptor agonist by an intravenous route (e.g., 20 mcg/kg/min to about 200 mcg/kg/min) or intracoronary route (e.g., about 2 mcg to about 20 mcg)? | sufficient to provide coronary artery dilation? | administering a radiopharmaceutical agent? | performing radiopharma-ceutical myocardial perfusion imaging? | parenteral use of adenosine receptor agonist? | method of radioimaging the coronary arteries? | adenosine administration as a pharmacological stressor in conjunction with any one of several noninvasive diagnostic procedures? |
|---|---|---|---|---|---|---|---|---|---|
| 1 | 3,935,214 | Yes, col 7, lines 13-17 | No | No | No | No | Yes col 7, lines 7-12 | No | No |
| 2 | 3,956,333 | No | Yes col 12 lines 1-26 | No | No | No | Yes col 12, lines 1-26 | No | No |
| 3. | 3,961,072 | Yes col 6, lines 22-36 | Yes col 5 lines 34-55 | No | No | No | Yes col 6 lines 22-36 | No | No |
| 4. | 3,962,334 | Yes col 10, lines 24-42 | No | No | No | No | No | No | No |
| 5 | 3,963,716 | No | No | No | No | No | Yes col 7, lines 54-66 | No | No |
| 6. | 3,966,916 | No | No | No | No | No | Yes col 8, lines 40-50 | No | No |
| 7. | ... | ... | ... | ... | ... | ... | ... | ... | ... |

| No. | US Patent No. | Claim(s) | Coverage |
|---|---|---|---|
| 1 | 5,691,328 | | Claims recite conjugates of "calcipotriol". |
| 2 | 6,764,493 | 16, 27 | Method of treatment using a biocompatible composition that includes DOVONEX (calcipotriol) |
| 3 | 6,642,218 | | Not calcipotriol (substituent Z differs) |
| 4 | 6,613,920 | | Not calcipotriol (substituent Z differs) |
| 5 | 6,600,058 | | Not calcipotriol (substituent Z differs) |
| 6 | 6,372,731 | | Not calcipotriol (substituent Z differs) |
| 7 | 6,927,205 | 15-16 | Method of treatment using pharmaceutical composition that includes calcipotriene. |
| 8 | 6,923,988 | 24-26, 82-84 | Pharmaceutical compositions that include calcipotriene. |
| | | 62-63 | Method of administering pharmaceutical composition that includes calcipotriene. |
| 9 | 6,884,782 | 97-98 | Method of administering a composition that includes calcipotriene. |
| 10 | 6,824,786 | 11 | Pharmaceutical composition that includes calcipotriol. |
| | | 52 | Method of applying a composition that includes calcipotriol. |
| 11 | 6,787,529 | 1, 9, 11 | Pharmaceutical composition that includes calcipotriol. |
| | | 20-23 | Method of administering the composition that includes calcipotriol. |
| 12 | 6,753,013 | 1-4, 11 | pharmaceutical composition that includes calcipotriol |
| | | 12-13 | Method of preparing lotion that includes calcipotriol |
| | | 18-21 | Method of administering the composition that includes calcipotriol. |
| | | 22-23 | Pharmaceutical composition that includes calcipotriol. |
| ... | ... | ... | ... |

FIG. 14

| Method of Medical Use Described | U.S. Patent Documents |
|---|---|
| Treatment of vulvovaginosis and vaginosis | U.S. Published Patent Applications 2003/0064103 and 2003/0017207 |
| Treatment of vaginal infection or bacterial vaginosis | U.S. Patent Nos. 5,840,744 and 5,536,743 |
| Treatment of viral infections | U.S. Published Patent Application 2003/0176483 |
| Treatment of measles viral infection | U.S. Patent No. 4,177,281 |
| Treatment of parasitic infections | U.S. Published Patent Application 2004/0161428 |
| Treatment of protozoan infection | U.S. Patent No. 6,271,203 |
| Treatment of clostridium difficile | U.S. Published Patent Application 2004/0106590 |
| Treatment of pruritic or neurogenic skin disorders | U.S. Published Patent Application 2006/0142304 |
| Treatment of immune dysfunction | U.S. Published Patent Application 2002/0119989 |
| Treatment of arthritis | U.S. Published Patent Application 2006/0172956 |
| Treatment of arthritis or bursitis | U.S. Patent No. 7,053,073 |
| Method of inhibiting sulfide production by sulfate reducing bacteria | U.S. Published Patent Application 2005/0238729 |
| Treatment of perspiration | U.S. Published Patent Application 2003/0215408 |
| Treatment of blepharitis | U.S. Patent No. 4,957,918 |
| Treatment of eye infections | U.S. Patent No. 6,551,584 |
| Treatment of Zollinger-Ellison syndrome | U.S. Patent No. 6,939,971 |
| Treatment of intraoral ulcers | U.S. Patent No. 6,555,125 |
| Treatment of psoriasis or seborrheic dermatitis | U.S. Patent No. 4,491,588 |

| Method of Medical Use Described | U.S. Patent Documents |
|---|---|
| Chemotherapy | U.S. Patent No. 4,921,963 |
| Treating gastrointestinal disorders | U.S. Patent Nos. 5,668,130 and 5,674,858 |
| Treating gastric and duodenal ulcers | U.S. Patent No. 5,620,964 |
| Treating helicobacter pylori infection | U.S. Patent No. 5,618,564 |
| Treating inflammatory bowel disease | U.S. Patent No. 5,599,795 |
| Periodontal treatment | U.S. Patent No. 5,599,553 |
| Treatment of urogenital disorders | U.S. Patent No. 5,827,543 |
| Treatment of clostridium difficile and other diarrhea associated conditions | U.S. Patent No. 5,773,000 |
| Treatment of neurological disease | U.S. Patent No. 6,689,756 |
| Treatment of infection caused by Chlamydia | U.S. Patent No. 6,884,784 |
| Treating hoof thrush and hoof rot | U.S. Patent No. 4,859,694 |
| Treating aquatic animals | U.S. Patent No. 6,518,252 |
| Treating reactive arthritis or bursitis | U.S. Patent No. 6,765,000 |
| Treating protozoan infections | U.S. Patent No. 5,646,114 |
| Treating chronic diarrhea | U.S. Patent No. 6,280,768 |
| Treatment of macular degeneration | U.S. Patent No. 6,218,368 |
| Treatment of periodontitis | U.S. Patent No. 4,997,830 |
| Treatment of multiple sclerosis | U.S. Patent No. 4,952,594 |
| Treatment of mesenteric adenitis | U.S. Patent No. 4,871,759 |
| Treatment of psoriasis or seborrheic dermatitis | U.S. Patent No. 4,491,588 |

FIG. 16

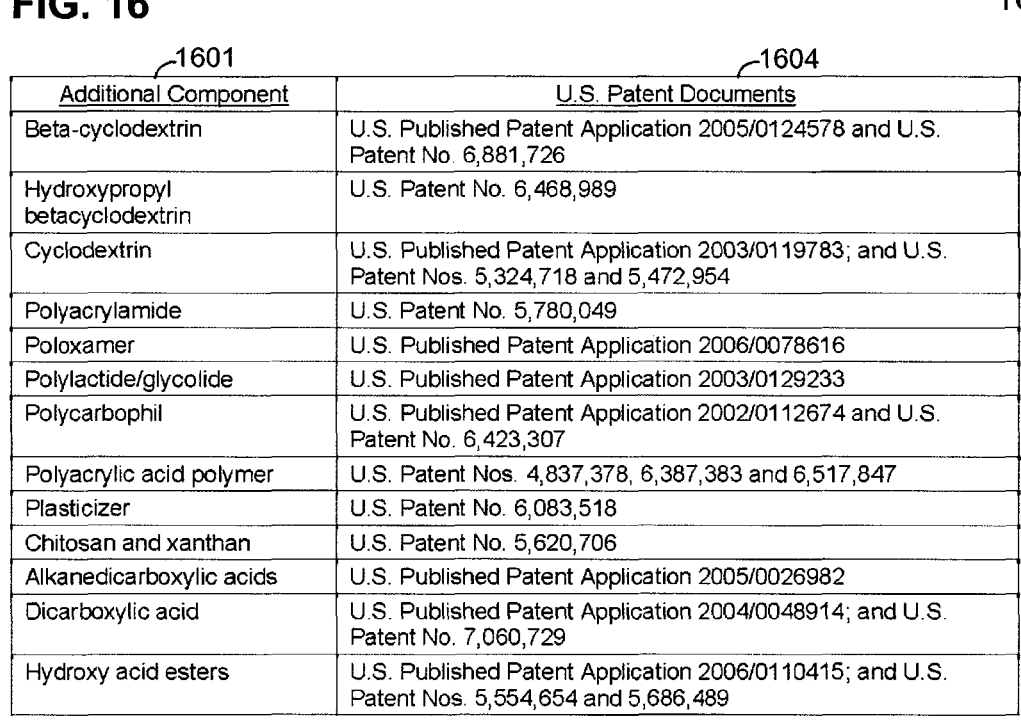

| Additional Component | U.S. Patent Documents |
|---|---|
| Beta-cyclodextrin | U.S. Published Patent Application 2005/0124578 and U.S. Patent No. 6,881,726 |
| Hydroxypropyl betacyclodextrin | U.S. Patent No. 6,468,989 |
| Cyclodextrin | U.S. Published Patent Application 2003/0119783; and U.S. Patent Nos. 5,324,718 and 5,472,954 |
| Polyacrylamide | U.S. Patent No. 5,780,049 |
| Poloxamer | U.S. Published Patent Application 2006/0078616 |
| Polylactide/glycolide | U.S. Published Patent Application 2003/0129233 |
| Polycarbophil | U.S. Published Patent Application 2002/0112674 and U.S. Patent No. 6,423,307 |
| Polyacrylic acid polymer | U.S. Patent Nos. 4,837,378, 6,387,383 and 6,517,847 |
| Plasticizer | U.S. Patent No. 6,083,518 |
| Chitosan and xanthan | U.S. Patent No. 5,620,706 |
| Alkanedicarboxylic acids | U.S. Published Patent Application 2005/0026982 |
| Dicarboxylic acid | U.S. Published Patent Application 2004/0048914; and U.S. Patent No. 7,060,729 |
| Hydroxy acid esters | U.S. Published Patent Application 2006/0110415; and U.S. Patent Nos. 5,554,654 and 5,686,489 |

FIG. 17

ELECTRONIC ORANGE BOOK DATABASE

ORANGE BOOK ANNUAL EDITION (click to access searchable .pdf) — 1702

ORANGE BOOK CUMULATIVE SUPPLEMENTS (click to access searchable .pdf) — 1704

U.S. PATENTS LISTED IN ORANGE BOOK — 1706

FDA APPROVED PRODUCTS LISTED IN ORANGE BOOK — 1708

SEARCH DATABASE [ 1710 ] SUBMIT — 1712

RUN REPORT — 1714

SEARCH RESULTS FOR "TESTOSTERONE"

1. Patent 4,849,224, "Device for administering an active agent to the skin or mucosa"
   ... steroids such as estradiol, progesterone, norgestrel, levonorgestrel, norethindrone, medroxyprogestrone acetate, testosterone and their esters, nitro-compounds ... (Detailed Description) [Found in Orange Book]

2. Patent 4,855,294, "Method for reducing skin irritation associated with drug/penetration enhancer compositions"
   *Found in Orange Book (p. 978, product number 020489 001)*

3. Patent 4,863,970, "Penetration enhancement with binary system of oleic acid, oleins, and oleyl alcohol with lower alcohols"
   Typical male sex hormones which may be utilized may be represented by, without limitation, testosterone, methyltestosterone, and fluoxymesterone. (Detailed Description) [Found in Orange Book]

4. Patent 4,983,395, "Device for administering an active agent to the skin or mucosa"
   ... steroids such as estradiol, progesterone, norgestrel, levonorgestrel, norethindrone, medroxyprogestrone acetate, testosterone and their esters, nitro-compounds ... (Detailed Description) [Found in Orange Book]

1802

5. Patent 5,152,997, "Method and device for transdermally administering testosterone across nonscrotal skin at therapeutically effective levels"
   Testosterone is administered transdermally through nonscrotal skin ... (Abstract)

| Expiration Date: 12/11/2010 |
   | Assignee: Theratech, Inc. |
   | Inventor(s): Ebert, Charles D.; Patel, Dinesh; Heiber, Werner |

1804

6. Patent 7,087,240, "Device and method for the treatment of erectile..."
   12. The delivery device of claim 8, wherein the therapeutic agent is selected from the group consisting of prostaglandin, a testosterone, a yohimbine ... (Claims) [Found in Related Patents of Patent 5,152,997]

7. Korenman et al., "Androgen Therapy of Hypogonadal Men with Transscrotal Testosterone Systems"
   ... select scrotal skin--which is highly permeable to testosterone--as a site for testosterone delivery ... (Am. J. Med. (1987) 83:471-478) [Found in Other References of Patent 5,152,997]

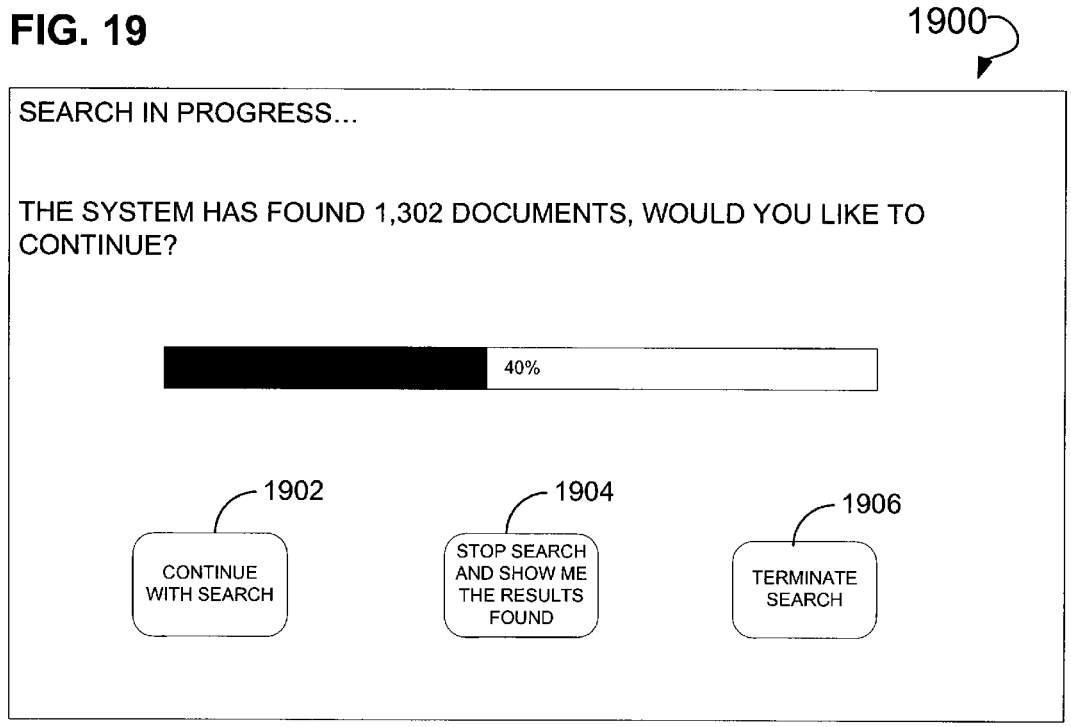

FIG. 20

☐ Active Pharmaceutical Ingredient (chemical name)
☑ Proprietary Name (trademarked name)
☐ Chemical Structure (e.g., ChemDraw)
☑ Molecular Formula
☐ API Clinical Pharmacology
☐ Names of all commercially (brand/proprietary) marketed formulations having active ingredient
☐ Indication of Use (broad, specific and labeled use)
☐ Formulation (active and inactive ingredients), including amounts, concentrations, pH, etc.
☑ Sales of Drug ($USD per year)
☐ Type of formulation (e.g., gel, lotion, ointment, etc.)
☐ Route of administration (e.g., topical, oral, IV, IP, rectal, buccal, vaginal, occular, etc.)
☐ *Dosage(s)*
☐ Marketing Company (NDA/ANDA Holder)
☐ Competing drug(s) (for same approved indication of use)
☐ Application Number (FDA)
☐ FDA Drug approval History (pdf)
☐ Possible third party ANDA Filer(s)
☐ Patent (pdf)
    ☐ File Wrapper for each patent above (pdf)
    ☐ Patent Applicant Holder (Assignee or Licensee)
    ☐ Reference(s) in intrinsic record (pdf)
    ☐ "Children/progeny" of the above issued patent(s) (pdf)
    ☐ "Parents" of the above issued patent(s) (pdf)
    ☑ "Patent family tree" of the above issued patent(s)
        ☐ Corresponding foreign patent(s) (pdf)
        ☐ File wrapper, e.g., opposition proceedings, of foreign patent(s) (pdf)
    ☐ Assignment of the above issued patent(s)
    ☐ "Small/large entity" status, and all small/large entity payments
    ☐ Maintenance fee payments
    ☐ Prior art (anticipatory/obviousness) claim chart (spreadsheet)
    ☐ Freedom-to-operate (non-)infringement) claim chart (spreadsheet)
    ☐ Small/Large entity status
    ☐ Maintenance fee payments
    ☐ Patent term extension(s)
    ☐ FDA Periods of exclusivity
    ☐ Disclaimed claims(s) per official Gazette (OG)
        ☐ Copy of relevant OG (pdf)
    ☐ Claim(s) held invalid per Federal Circuit
        ☐ Copy of Fed. Cir. decision (pdf)
    ☐ Clean copy of issued claims (pdf)
        ☐ Intrinsic support for each claim limitation (pdf)
        ☐ Extrinsic support for each claim limitation (pdf)
    ☐ Marked-up copy of issued claims (pdf)
        ☐ Intrinsic support for each claim limitation (pdf)
        ☐ Extrinsic support for each claim limitation (pdf)
    ☐ Claim "tree" showing listing of each claim during prosecution (pdf)

( RUN REPORT )

PATENT CLAIM REFERENCE GENERATION

CROSS REFERENCE TO RELATED APPLICATIONS

This patent application is a continuation of U.S. patent application Ser. No. 11/759,620, entitled "Patent Claim Reference System", filed on Jun. 7, 2007, which claims the benefit of priority, under 35 U.S.C. Section 119(e), to U.S. Provisional Patent Application Ser. No. 60/804,143 entitled "Patent Claim Reference System", filed on Jun. 7, 2006, U.S. Provisional Patent Application Ser. No. 60/829,718 entitled "Patent Claim Reference System", filed on Oct. 17, 2006, and to U.S. Provisional Patent Application Ser. No. 60/883,471 entitled "System and Method for Patent Claim Reference", filed on Jan. 4, 2007 which are incorporated by reference herein in their entirety.

TECHNICAL FIELD

This patent document relates generally to patent claim information as implemented in software, and more specifically, but not by way of limitation, to a patent claim reference system.

BACKGROUND

The value of a patent and the technology disclosed therein, to some extent, hinges on the ability to identify patents, printed publication, and other data within the same technology space as the patented technology. Once identified, the relative strength of the patent, and its claims. may be determined.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BRIEF DESCRIPTION OF THE DRAWINGS

Some embodiments are illustrated by way of example and not limitation in the figures of the accompanying drawings in which:

FIG. 2 is a schematic of a system diagram illustrating a data request, according to an example embodiment.

FIG. 3 is a schematic of a system diagram illustrating the providing of drug data, according to an example embodiment.

FIG. 11 illustrates some embodiments of a user interface to display claims and relevant references associated with claim limitations within each claim, according to an example embodiment.

FIG. 12 is a portion of claim chart organized to illustrate references (e.g., patents or publications) that disclose or suggest an associated claim limitation, according to an example embodiment.

FIG. 13 is a portion of a claim chart organized to illustrate references that contain one or more claims that contain a keyword or other related term, according to an example embodiment.

FIG. 14 is a portion of a Freedom to Operate (FTO) chart including U.S. patent documents having claims that pose freedom to operate concerns for design-around formulation of METROGEL® (metronidazole gel), according to an example embodiment.

FIG. 15 is a portion of a FTO chart including example U.S. patent documents having claims that recite metronidazole, in combination with another active agents and/or ingredients, for use in methods of medical treatment other than rosacea, according to an example embodiment.

FIG. 16 is a portion of a FTO chart including example U.S. patent documents having claims that recite a formulation that includes metronidazole, in combination with at least one other operation, according to an example embodiment.

FIG. 17 illustrates a directory screen, according to an example embodiment.

FIG. 18 illustrates a search results screen, according to an example embodiment.

FIG. 19 illustrates a search in progress screen, according to an example embodiment.

FIG. 20 illustrates a report generation screen, according to an example embodiment.

DETAILED DESCRIPTION

Figure 1:
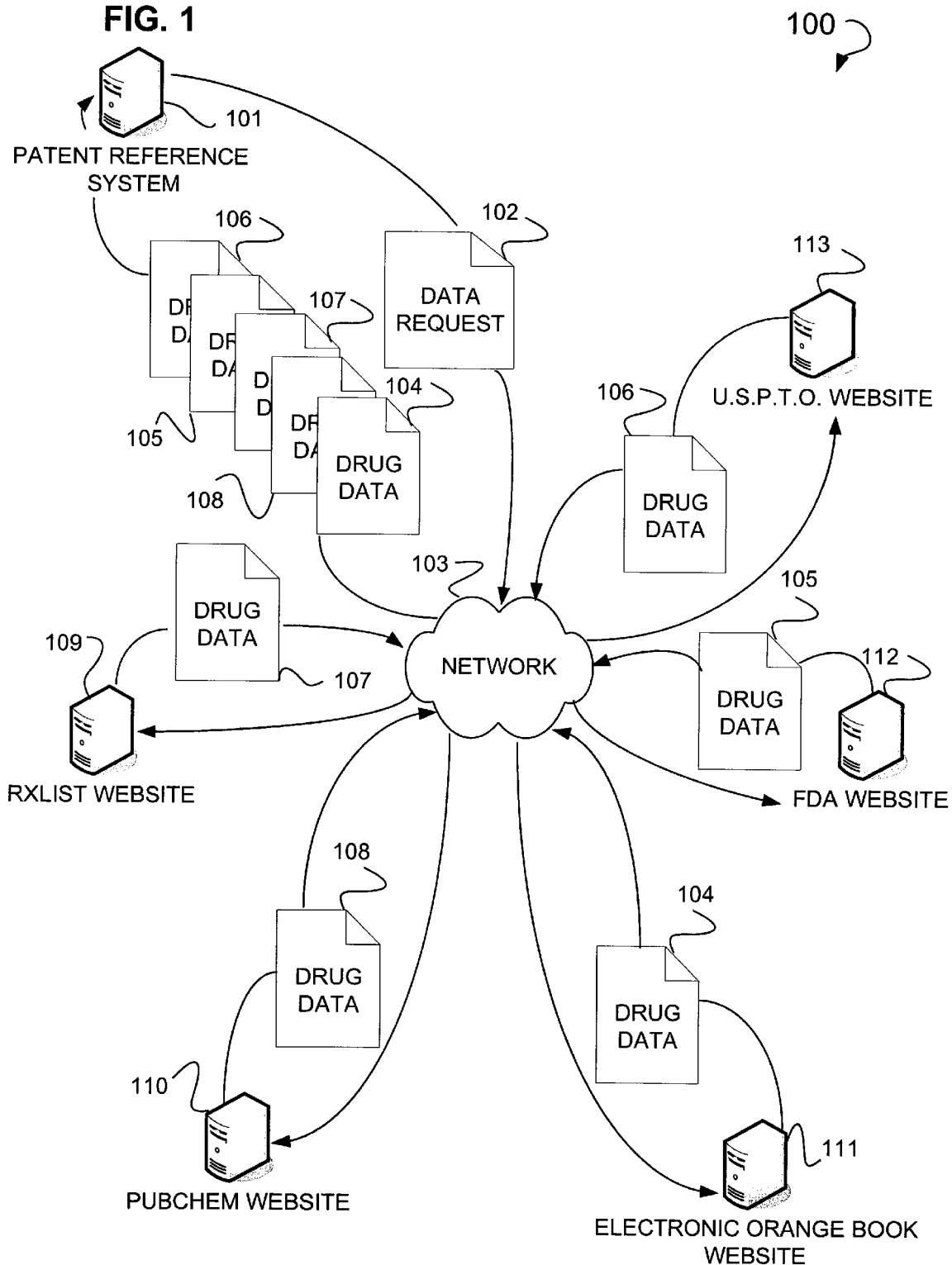
FIG. 1 is a network diagram illustrating a system used to obtain information regarding chemical compounds including drugs from a variety of Web sites, according to an example embodiment.

The following detailed description includes references to the accompanying drawings, which form a part of the detailed description. The drawings show, by way of illustration, specific embodiments in which the invention may be practiced. These embodiments, which are also referred to herein as "examples," are illustrated in enough detail to enable those skilled in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Various embodiments illustrated herein provide computerized patent claim reference systems, methods, data structures, and encoded instructions. Some such embodiments provide methods of storing patent reference data and methods of presenting patent reference data. One example embodiment comprises a computerized patent claim reference system, including a claim limitation listing showing claim limitations of at least one claim of a patent, and at least one hyperlink linking one of the claim limitations to one or more references defining the claim limitation.

Patents in the United States are granted to inventors of new processes, devices, manufacturable objects, and compositions. An issued patent gives the inventor the right to exclude others from practicing what is claimed in the issued claims of the patent for a period of time, in exchange for disclosure of information related to the invention such as the best mode known of practicing the invention and sufficient description in the specification portion of the patent for someone skilled in the area of the patent to practice what the patent claims. The claims of a patent are therefore used to define the scope of what the patent covers, and the remainder of the patent supports or explains what is covered in the claims.

Obtaining a United States patent involves filing a patent application with the Patent and Trademark Office (PTO), which is a government entity within the Department of Commerce. The patent application is examined for proper form, for novelty, and for other purposes. The process of examination is also referred to as patent prosecution. Patent prosecution may include one or more official PTO correspondences between the PTO and the inventor or the inventor's representative. Such correspondence may include assertions regarding suspected problems with the patent application by a PTO Examiner, as well as responses, which may include arguments or amendments, by inventors or their representatives. Information exchanged during this patent prosecution process is often useful in determining the scope of a patent, because amendments, arguments, or disclosures made during prosecution may limit the scope or validity of patent claims under some patent laws.

In certain situations, such as during litigation or reexamination, evidence may be used to interpret or limit the claims. During prosecution, a record is created. This prosecution record, including the patent itself, is considered "intrinsic evidence." In addition to intrinsic evidence, some "extrinsic evidence" may be referenced. Extrinsic evidence, such as dictionary definitions of terms and published papers or articles, may also be used to interpret or define terms or phrases used in claims. Gathering and evaluating intrinsic and extrinsic evidence is time consuming and burdensome.

Typically, to determine relevant intrinsic evidence, the patent prosecution record and references used during prosecution may be obtained and carefully evaluated by legal personnel. Additionally, to obtain extrinsic evidence, publications (e.g., papers, books, dictionaries, technical manuals, etc.), or experts may be consulted.

The process of gathering and organizing intrinsic and extrinsic evidence related to a patent application's prosecution is expensive and time-consuming. Various factors including the volume of information that must be considered and the expertise and training required to provide a thorough legal analysis contribute to this burden.

An Example System

FIG. 1 is a network diagram illustrating an example system 100 used to obtain information regarding chemical compounds including drugs from a variety of Web sites. Illustrated is a patent reference system 101 operatively coupled to the network 103. In some embodiments, this network 103 is a Local Area Network (LAN), a Wide Area Network (WAN) or a network of networks such as the Internet. Also illustrated are a number of Web sites including an Rxlist Web site 109, a United States Patent and Trademark Office (USPTO) Web site 113, a Food and Drug Administration Web site 112, an Electronic Orange Book Web site 111, and a Pub Chem Web site 110. Collectively, these Web sites may be thought of as regulatory Web sites (e.g., operated by a government, regulatory agency) having associated regulatory databases. Each of these Web sites is operatively coupled to the network 103 and ultimately the patent reference system 101. Supporting each of these Web sites is a Web server, application server, and database server (not pictured) as are known in the art.

In some embodiments, a data request (e.g., a search query) 102 is made by the patent reference system 101 seeking data relating to chemical molecules, compounds or other patentable subject matter. As may be more fully illustrated below, in some cases this data request may take the form of the execution of a Web crawler or other application designed to elicit information from, for example Web pages or other sources of data available on the network 103. In some cases, direct queries may be made of a Web site (e.g., 109, 110, 111, 112, or 113). Once a data request 102 is made, then drug data may be returned from each of the Web sites in response to the query. In some cases, the drug data (e.g., retrieved data or data) (e.g., 104-108) may be pulled from the Web site by, for example, a Web crawling application, while in other cases it may be pushed by the Web site in response to a direct query by the patent reference system 101. Further, this drug data (e.g., the retrieved data or data) may be in the form of, for example, a Hyper Text Markup Language (HTML) based web page, a Portable Document Format (.pdf) formatted file, or some other suitable file (e.g., .tiff, .png, .gif. etc.). As will be more fully illustrated below, upon retrieval, this drug data may be parsed based upon claim language, limitations, and stored for future use.

In some embodiments, Web site and associated data stores relating to arts other than the chemical and biological arts may be accessed for the purpose of obtaining information relating to a patent. For example, when obtaining information relating to the patent in the electrical or software arts, web site Web sites run by organizations such as the Institute of Electrical and Electronics Engineers (IEEE) or the Association for Computing Machinery (ACM) may be accessed for the purpose of obtaining extrinsic evidence. The use of Web site and data sources related to the chemical and biotechnology arts is merely for illustrative purposes and is not meant to limit the scope of the system and method illustrated herein.

FIG. 2 is a schematic of a system diagram 200 illustrating the data request 102. Illustrated is a patent reference system 101 making a data request 102 of an electronic orange book Web site 111 over a network 103. Some embodiments may include making a query (e.g., a search query) of any one of a number of regulatory or non-regulatory Web sites controlling the flow of publicly available or privately available information from public or private data warehouses. In one example embodiment, a data request 102 may be in the form of a Hyper Text Transfer Protocol (HTTP) or Secured Hyper Text Transfer Protocol (HTTPS) method call to GET a particular Web page containing data relating to a particular active ingredient in a drug (e.g., fluticasone). Additionally, in some embodiments, this GET request may center on a GET request seeking data relating to the commercial or trade name for a drug. For example, a data request could be made for the active ingredient paroxetine hydrochloride or the drug PAXIL™. Further, in some embodiments, an HTTP or HTTPS HEAD method call may be invoked to make a data request.

FIG. 3 is a schematic of a system diagram 300 illustrating the providing of drug data 104, in response to the data query 102. Drug data 104 is illustrated as being provided to the patent reference system 101. In FIG. 3, drug data 104 relates to, for example, the active ingredient fluticasone, and a variety of listings 301 are displayed relating to this active ingredient. Also illustrated, is the method of use 302 and additional information 304. The listings for fluticasone are not limited, as indicated by the continuation ellipsis 303, to those illustrated in drug data 104. As illustrated, this drug data 104 may, for example, be in the form of a Web page containing data relating to a particular active ingredient in a drug and may include the name of the drugs (e.g., trade name or otherwise) associated with the active ingredient, the patents claiming the active ingredient, certain exclusivity periods (e.g., FDA exclusivity periods) associated with the drug, file wrapper information, Abbreviated New Drug Application (ANDA) information and histories, or any other type of information that may be posted to a Web site (e.g., text files). Once this information is received, it may be parsed into a predefined format so as to allow it to be stored into a database for easy access and display.

Figure 4:
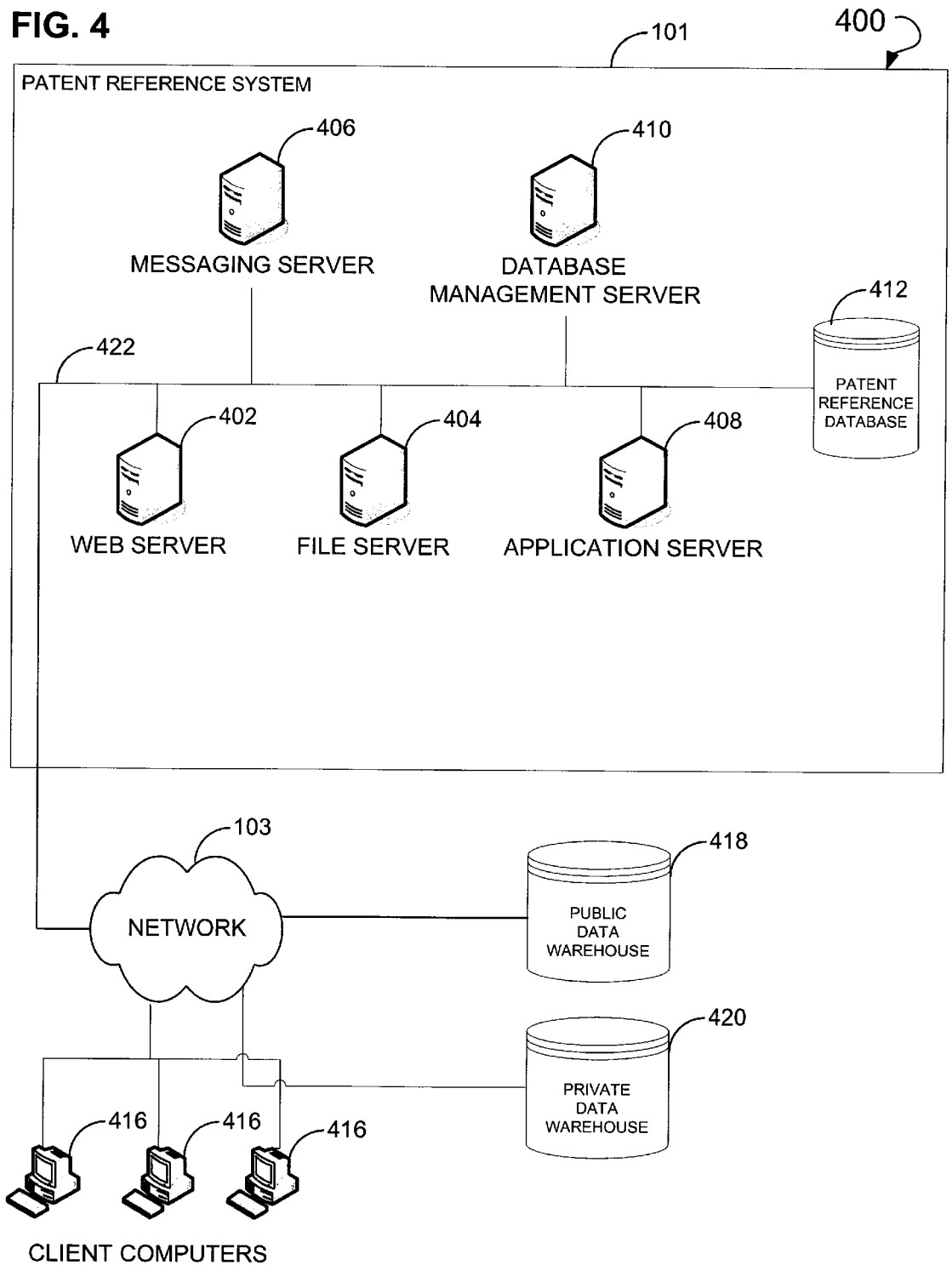
FIG. 4 is a schematic view of a patent reference system capable of collecting, organizing, and managing patent references, according to an example embodiment.

FIG. 4 is a schematic view of a patent reference system 101 capable of collecting, organizing, and managing patent references. In some embodiments, the patent reference system 101 includes a Web server 402, a file server 404, a messaging server 406, an application server 408, a database management server 410, and a patent reference database 412, all communicatively coupled via a network connection 422. Servers 402, 404, 406, 408, 410 may include software management programs, hardware devices, or combinations of software and hardware. In addition, one or more servers 402, 404, 406, 408, 410 may be implemented on a shared device or in a shared program. These software management programs may be implemented as various software operations (see description of software operations outlined below). Network connection 422 may connect to a single LAN or WAN, or combinations of LANs or WANs, such as the Internet. Network connection 422 may be implemented using wired or wireless connections.

One or more client computers 416 may be communicatively coupled to the patent reference system 101 via a network 103. The network 103 may include a single LAN or WAN, or combinations of LANs or WANs, such as the Internet. The various devices coupled to the network 103 may be coupled to the network 103 via one or more wired or wireless connections. One or more public data warehouses 418 and one or more private data warehouses 420 may also be communicatively coupled to the patent reference system 101 via the network 103.

The Web server 402 may communicate with the file server 404 to publish or serve files stored on the file server 404. The Web server 402 may also communicate or interface with the application server 408 to enable Web-based presentation of patent-related information. For example, the application server 408 may consist of scripts, applications, or library files that provide primary or auxiliary functionality to the Web server 402 (e.g., multimedia, file transfer, or dynamic interface functions). In addition, the application server 408 may also provide some or an entire interface for the Web server 402 to communicate with one or more of the other servers in the patent reference system 101, e.g., the messaging server 106406 or the database management server 410.

The application server 408 may also contain one or more software programs capable of searching, collecting, or organizing references from disparate sources. One example of such a program includes a Web crawler, also known as a Web spider or robot. Web crawlers include programs that are specifically designed to browse the World Wide Web in an automated, methodical manner. Some Web crawlers are programmable, such as being able to filter on a particular subject matter area or restrict crawling to a particular group of Web sites. Another example of a software program that may be hosted on the application server 408 for such an operation includes a script or a dedicated program to periodically or regularly search one or more specific Web sites. Such a script or dedicated program may be available from a content provider. For example, a content provider may grant licenses to proprietary content for a fee. As a provision of the license, the licensee may be given a program, such as a client program, to access the proprietary content. The client program may be configurable to automatically search or retrieve data from the content provider's data store and save resulting data, such as to the patent reference database 412.

In some embodiments, this Web crawler application may have a selection policy geared toward downloading Web pages and the content contained therein relating to pharmaceutical industry drug data. This policy may provide a uniform policy for revisiting certain Web sites displaying pharmaceutical industry drug data where all Web sites are re-visited with the same frequency, regardless of the rate of content or Web page change taking place on the site. In some embodiments, a proportional policy may be invoked where Web sites are re-visited based upon the frequency of Web page or content change on a particular Web site. In some embodiments, the crawler application itself engages in, for example, path-ascending crawling, focused crawling, deep Web crawling, and/or may restrict the number of followed links that it analyzes. Some embodiments may include some other suitable Web crawler application(s).

Public data warehouses 418 may include an online interface and a data storage mechanism. For example, a Web-based interface may be provided such that a user may access the public data warehouse 418 to search for patents or publications related to an issued patent. Examples of a public data warehouse 418 include the USPTO Web site (www.uspto.gov), the Food and Drug Administration's (FDA) Web site (www.fda.gov), and the World Intellectual Property Organization (WIPO) Web site (www.wipo.int).

Private data warehouses 420 may include online or offline data stores. Online data stores may be configured similar to public data warehouses 418, such as by providing an interface (e.g., a Web browser interface) to a data source (e.g., a database). Examples of private data warehouses 420 include Thompson WESTLAW® (www.westlaw.com) and LEXISNEXIS® (www.lexis.com). Typically private data warehouses 420 include a membership or subscription to browse, view, or search data. Other private data warehouses 420 may use a "pay per use" fee structure.

The patent reference database 412 may include data such as published patent applications, issued patents, publications, and the like. The patent reference database 412 may be implemented as a relational database, a centralized database, a distributed database, an object-oriented database, a flat database, or other database type depending on the specific embodiment. In some embodiments, the patent reference database 412 includes one or more databases (e.g., a patent database, a publications database, a user database, a search terms database, a claim limitations database), such that the combination of the one or more databases may be referred to as a patent reference database.

During operation, in one embodiment, patent reference information is collected and stored in the patent reference database 412. A user (not shown) may access the patent reference system 101, such as by using a client computer 416 over the network 103. The user may select a patent application or publication of interest and review one or more references related to the patent application or publication. In some embodiments, summary reports or other information may be sent to the user, for example at the user's request or periodically, via the messaging server 406. Messages distributed by the messaging server 406 may include one or more of e-mail, voice, text messaging, or other communication protocols or mediums. Further capabilities of the patent reference system 101 are illustrated herein.

Example Logic and Interfaces

Figure 5:
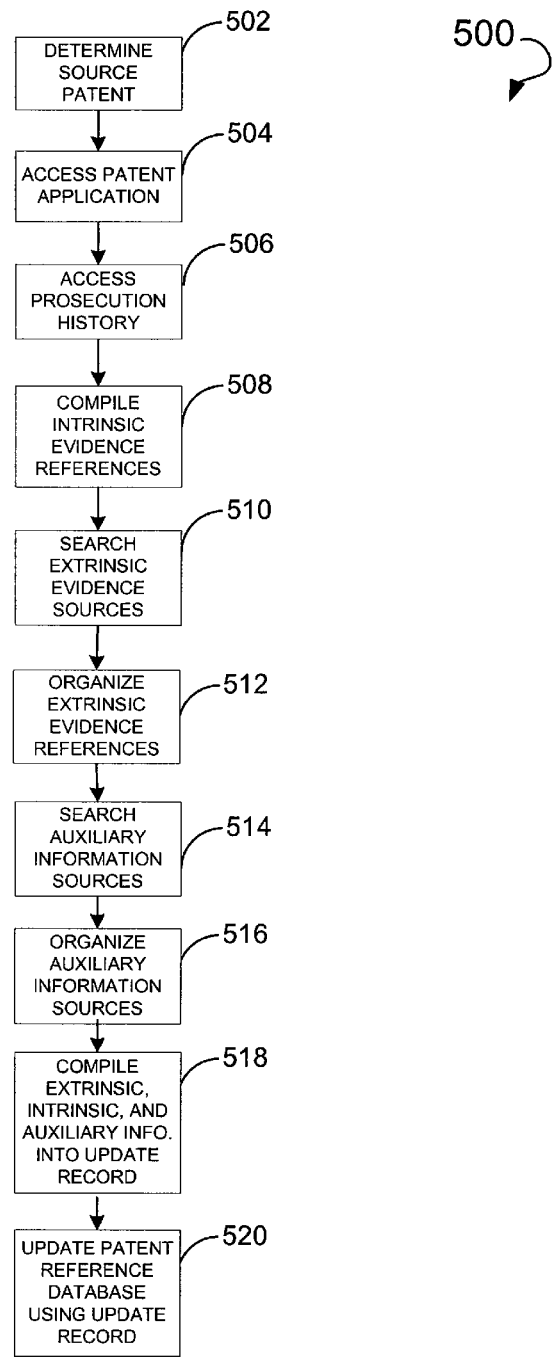
FIG. 5 is flowchart illustrating a method for managing and updating the patent reference database in the patent reference system, according to an example embodiment.

FIG. 5 is a flowchart showing a method 500 for managing and updating the patent reference database 412 in the patent reference system 101. A series of operations (e.g., 502, 504, 506, 508, 510, 512, 514, and 516) are illustrated to implement the method 500. At 502, an operation is illustrated to determine a source patent. The source patent is the patent of interest and may include a patent application or an issued patent. In some embodiments, the source patent is provided (e.g., as input) by a user of the patent reference system 101, such as via the client computer 416 and a user interface provided by the Web server 402. In other embodiments, the source patent may be obtained by one or more automatic or semi-automatic techniques such as, for example, a user providing a search query via a user interface, the search query identifying a patent. For example, a script may be configured to regularly or periodically query the USPTO Web site for recently issued patents. The script may be further configured to filter the result set by a specific art area or technology area. As another example, the patent reference system 101 may be configured to communicate with a docketing or document management system. For example, when a patent is issued and the records in the docketing or document management system are updated to reflect the new status, the patent reference system 101 may be triggered, automatically or manually, to set the newly issued patent as a source patent for the purposes of the method 500.

At 504, an operation is illustrated to facilitate access to a patent application or issued patent. In some embodiments, one or more of the sections in the source patent are extracted and saved, such as to the patent reference database 412. Sections may include the claims, background, summary, abstract, detailed description, or the like. Text sections, such as the background, may be saved in the patent reference database 412 as a text, string, or other appropriate data type. Image sections, such as figures, chemical structures, or mathematical formulae, may be saved as an image in the patent reference database 412 or the image section may be saved on a file server, e.g., 404, with a reference to the image's location saved in the patent reference database 412. The patent application may be accessed from one or more sources, including a public data warehouse 418 or a private data warehouse 420. In some embodiments, a client software program, such as a script or a dedicated program, may read and analyze one or more patents or patent applications. The client software program may reside on the application server 408, Web server 402, or database management server 410, in various embodiments. In some embodiments, portions of the client software program may reside in two or more locations in the patent reference system 101.

In some embodiments, one or more patent applications or issued patents are formatted using a standardized interface language. The standardized interface language may be written using a nationally or internationally standardized language, such as an eXtensible Markup Language (XML), HTML, a proprietary or specialized interface language, or some other suitable language. For example, a public data warehouse may provide a dedicated client application to access the data stored in the public data warehouse. To communicate the information between the public data warehouse and the client application, the public data warehouse may implement a standardized interface, such as a message structure, encryption, or other means to provide the particular information exchange.

In some embodiments, the client software program may use the standardized language to parse and separate the different available portions of a patent or patent application, such as the Background, Detailed Description, or Claims. In some embodiments, the client software program may be configured to analyze and parse a patent application or patent that is not in a standardized interface format. For example, the client software program may receive a file in an image format, such as .pdf, and convert the image text to ASCII text or Unicode text. The program may then determine each available section of the patent or patent application, such as by using contextual keyword searching, positional searching, or the like. In some embodiments, the software program may analyze and extract a preliminary parsing of a patent or patent application and then present the preliminary parsing to a user for confirmation or modification before storing the parsed portions.

At 506, an operation is illustrated to allow access to a patent application's prosecution history or "file wrapper". In some embodiments, portions or all of the prosecution history are obtained and saved, such as to the patent reference database 412. Similar to the patent application, the file wrapper may be accessed from one or more sources, including a public data warehouse 418 or a private data warehouse 420.

At 508, an operation is illustrated to allow for intrinsic evidence references (e.g., data) to be compiled. In some embodiments, the patent application obtained at 504 and the file wrappers obtained at 506 are analyzed to produce one or more references of intrinsic evidence. In some embodiments, gathering or compiling intrinsic evidence references includes identifying one or more claims related to the patent application, parsing and extracting one or more claim limitations, and using the extracted claim limitations as search terms to search the patent application or file history. An automatic search of the file history may find statements of record or references related to a particular claim limitation. This automatic search may, for example, be a string comparison based search. Statements of record may include statements or assertions made by an examiner or statements or arguments made by an applicant during the process of patent prosecution. Such statements may characterize a claim limitation, such as to narrow or limit the interpretation of claim language. In various embodiments, searching the patent application or the patent file wrapper for intrinsic evidence is performed manually, in part or in whole. In some embodiments, one or more portions of an office action or other correspondence may be presented to a user to confirm that the portions include a statement of record, assertion, concession, or the like. Confirmed statements may then be stored, such as in the patent reference database 412. In some embodiments, resulting intrinsic evidence (e.g., statement of record, reference) is captured in the patent reference database 412. In a further embodiment, the patent reference database 412 includes a relational database and one or more relationships are created between a particular claim limitation and a portion of intrinsic evidence that illustrates, defines, or limits the particular claim limitation.

In some embodiments, the automated search of the file history, or, more generally, of the extrinsic and instrinsic evidence, may be performed manually by a reviewer reviewing various documents (e.g., instrinsic or extrinsic evidence), and then highlighting (e.g., tagging) certain selections of these various documents. These selections may correspond to certain terms or phrases of claims limitation in patent for which the various documents are relevant. This tagging may be in the form of XML based tagging or some other tagging regime.

At 510, an operation is illustrated to allow for one or more extrinsic evidence sources (e.g., data) to be searched for relevant references. Extrinsic evidence sources may include one or more of a public data warehouse 418 or a private data warehouse 420. Extrinsic evidence may include things such as dictionary definitions, journal articles, reference books, or the like. Searching extrinsic evidence sources may use one or more of the claim limitations, such as those parsed and extracted at 508. Extrinsic evidence searches may be partially or wholly automated and may include filtering or other adaptive behavior in various embodiments. Adaptive behavior may include detecting a particular technology area of the source patent and searching a particular subset of extrinsic evidence sources. For example, when claim limitations are directed to the pharmaceutical technology area, more efficient searching may be obtained by limiting keyword searches to chemical or pharmaceutical references (e.g., the PDR (Physician's Desk Reference) or the Food and Drug Administration's (FDA) Approved Drug Products with Therapeutic Equivalence Evaluations, also known as the Orange Book), rather than, for example, references in the computer technology area (e.g., ACM or IEEE journals). Adaptive behavior may also include a progressive or "drill-down" searching technique. For example, search results of one search may be used as keywords in successive searches. As a detailed example, if a claim limitation includes a pharmaceutical composition, then the drug's generic and brand names may be found by searching one or more public data warehouses 418 or private data warehouses 420, such as the FDA Web site, the online Orange Book, or RxList.com. Additional information, such as the drug's active ingredient, owner, or known uses may also be found using such sources. Information found during this initial search may then be used to search for a pharmaceutical by its brand name, generic name, or chemical name. In another form of progressive searching, an iterative or recursive approach is used. For example, a source may be searched using a term from a claim limitation. The search result may include one or more synonyms of the term from the claim limitation, which may then be used as a search term of the same source in an iterative or recursive manner.

At 512, an operation is illustrated to allow for extrinsic evidence references found at 510 to be organized. In some embodiments, portions of or all of the related references are saved in the patent reference system 101, such as in the file server 404 or in the patent reference database 412. In some embodiments, the patent reference database 412 includes a relational database and one or more relationships are created between a claim limitation and a related reference of extrinsic evidence.

At 514, an operation is illustrated to allow for one or more auxiliary information sources to be searched for information. Auxiliary information sources may include one or more of a public data warehouse 418 or a private data warehouse 420. Auxiliary information may include things such as patent assignment information, landmark dates (e.g., filing, issue, or other priority dates), small entity status information, maintenance fee information, patent term extension, or other information related to the validity or form of a source patent application or source issued patent. For example, a public data warehouse 418, such as the USPTO's patent database, may be searched for auxiliary information. Some of the auxiliary information stored at the USPTO is mirrored or otherwise compiled at other data warehouses, for example, Web sites including freepatentsonline.com or micropat.com.

At 516, an operation is illustrated to allow for auxiliary information related to the source patent to be organized. In some embodiments, the auxiliary information is stored in the patent reference database 412 and related to the source patent, such as by using relationships in a related database configuration.

At 518, an operation is illustrated to compile the extrinsic, intrinsic and auxiliary information into an updated record. This updated record may take the form of an XML file, data stream, or some other suitable carrier of data.

At 520, an operation is illustrated that updates a database record (e.g., a record existing within the patent reference database 412) using the information contained within the update record generated by the operation at 518.

Figure 6:
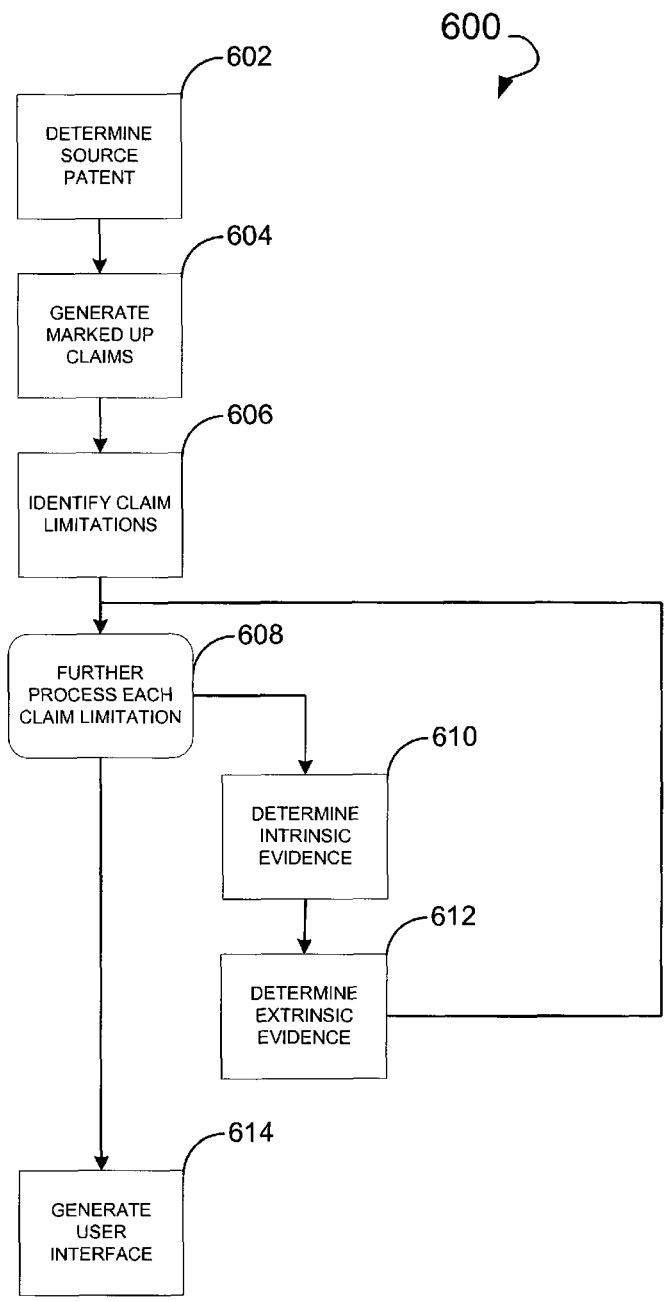
FIG. 6 is a flowchart illustrating a method of presenting a patent claim and related intrinsic and extrinsic reference information, according to an example embodiment.

While FIG. 5 illustrates some embodiments of a method of managing and updating information in a patent reference system 101, FIG. 6 illustrates examples of using the information stored in such a patent reference system 101.

FIG. 6 is a flowchart of a method 600 of presenting a patent claim and related intrinsic and extrinsic reference information. A sequence of operations used to implement the method 600 are illustrated (e.g., operations 602, 604, 606, 608, 610, 612, and 614). At 602, an operation is illustrated to allow a source patent to be determined. In some embodiments, the source patent is provided by a user of the patent reference system 101, such as via a Web browser interface.

At 604, an operation is illustrated to allow for marked-up claims to be generated. In some embodiments, the issued claims are analyzed in relation to the original claims as filed and claims presented during prosecution. Amendments of original claims may be captured in a "marked up" version. The marked up version of the claims may be presented to the user using one or more indications that signify an addition, a deletion, or a modification of claim language in the marked up version. For example, original claim language may be presented in plain text, while insertions may be presented using an underlined font and deletions may be presented using a strikethrough font. When several claim revisions are presented in the same marked up version, in one embodiment, subscripting is used to indicate which claim amendments were made in the same USPTO filing. Subscripts may be used in conjunction with footnotes. In various other embodiments, markups are indicated using color, font face, font size, font weight, punctuation, multimedia effects, or the like. For example, on systems that don't support underlining text, italic or bold may be used instead to indicate inserted claim language. Additionally, on systems that don't support color or textual effects (e.g., underline or bold), different font faces could be used to indicate revisions from the original text. In another embodiment, a popup window (e.g., a tool tip) may be used to visually indicate the origin or history of the claim revision.

At 606, an operation is illustrated that allows for identification of individual claim limitations. In some embodiments, claim limitations are only identified by an individual actually making a comparison between the claims and the intrinsic and extrinsic sources of evidence. In another embodiment, claim limitations, regardless of whether the limitation was deleted, revised, or otherwise modified during prosecution, are identified. In some embodiments, claim limitations are stored as separate data, such as in patent reference database 412 and related to other data, such as intrinsic references, extrinsic references, or amendments made during prosecution. For example, claim limitations parsed and extracted during the building or updating of the patent reference system 101, e.g., block 508 of method 500 of FIG. 5, may be stored so that they may be referred to during later operations, such as the instant method 600.

Some embodiments may include identifying individual claim limitation through receiving a document containing claims (e.g., an issued patent or patent application), parsing out the claims, and then parsing out the terms that make up the claims identifying those terms that need to be defined. With regard to the parsing of the claims, a grammar may be developed to support the parsing that, among other things, looks for certain delimiting terms or phrases (e.g., "We claim", "What is claimed is" etc.), and extracts all subsequent language. In some embodiments, certain tags (e.g., HTML or XML tags) are searched for that denote claims, and where encountered the claim terms or phrases are parsed out. Given the relatively small size of the resulting parsed claims, then the terms or phases that make up the claims may be parsed out using delimiters such as ";", or the empty space character. Additionally, where tags are present to denote claim and claim limitations, these tags may be used as the basis for parsing.

At 608, an operation is illustrated to allow for each identified claim limitation to be used as a basis for further processing. At 610, related intrinsic evidence is determined for a current claim limitation. In some embodiments, related intrinsic references are readily available using the patent reference database 412 configured in a relational database model. The related references may be searched, parsed, or otherwise manipulated to extract one or more portions relevant to the particular claim limitation. For example, if a claim limitation includes "liquid," then the specification (e.g., abstract, detailed description, figures, etc.) of the issued patent is searched and sentences, passages, figures, or other description that characterizes, defines, or illustrates the limitation are extracted. In addition, prosecution history is searched for statements in responses or office actions, patents, publications, or other material that may characterize, define, or illustrate the limitation. Such information is extracted and may be saved, such as in the patent reference database 412. In some embodiments, citations to relevant portions of the specification or the prosecution history are saved in place of, or in addition to, portions of the relevant references.

At 612, an operation is illustrated to relate extrinsic evidence to a current claim limitation. In some embodiments, similar to the intrinsic reference information, extrinsic references may be readily available, being previously discovered, stored, and associated to one or more claim limitations using the patent reference database 412. In some embodiments, citations to relevant portions of extrinsic references are determined and stored, such as in the patent reference database 412. In another embodiment, portions or all of a relevant extrinsic reference are stored and associated with the particular claim limitation.

At 614, an operation is illustrated to generate a user interface to present the claim limitations and the relevant associated intrinsic and extrinsic references. In some embodiments, the user interface is presented using a Web browser and a markup language, such as HTML or XML. In another embodiment, the user interface includes a client computer interface and is provided using a dedicated client program. In some embodiments, the dedicated client program is written in a programming language for a particular software platform (e.g., WINDOWS™ or MACINTOSH™) and utilizes one or more libraries (e.g., MICROSOFT FOUNDATION CLASSES™). In other embodiments, the dedicated client program is implemented using a cross-platform language, such as Java by Sun Microsystems.

The user interface may contain links to relevant intrinsic or extrinsic documents in one or more computer-readable formats, such as MICROSOFT WORD™ or Adobe PDF™. In other embodiments, portions or all of a relevant reference is provided to a user in a browser window as text. In any case, the user may copy and paste relevant information to a separate document, such as a MICROSOFT WORD™ file, for example, to compose an opinion letter.

In another example embodiment, claim limitations, related intrinsic references, and related extrinsic references are analyzed to determine whether one or more inconsistent statements exist related to a claim limitation. For example, during prosecution an applicant may illustrate a claim limitation in such a way as to limit its scope. However, the same or similar claim limitation may be characterized or illustrated in an incongruent manner in a different document, such as an ANDA filing. In some embodiments, identified inconsistent statements are flagged or otherwise marked such that the user may easily detect them. In a graphical user interface, techniques such as popup windows or alerts, sounds, or animated graphics may be used alone or in combination to mark or flag identified inconsistent statements.

Figure 7:
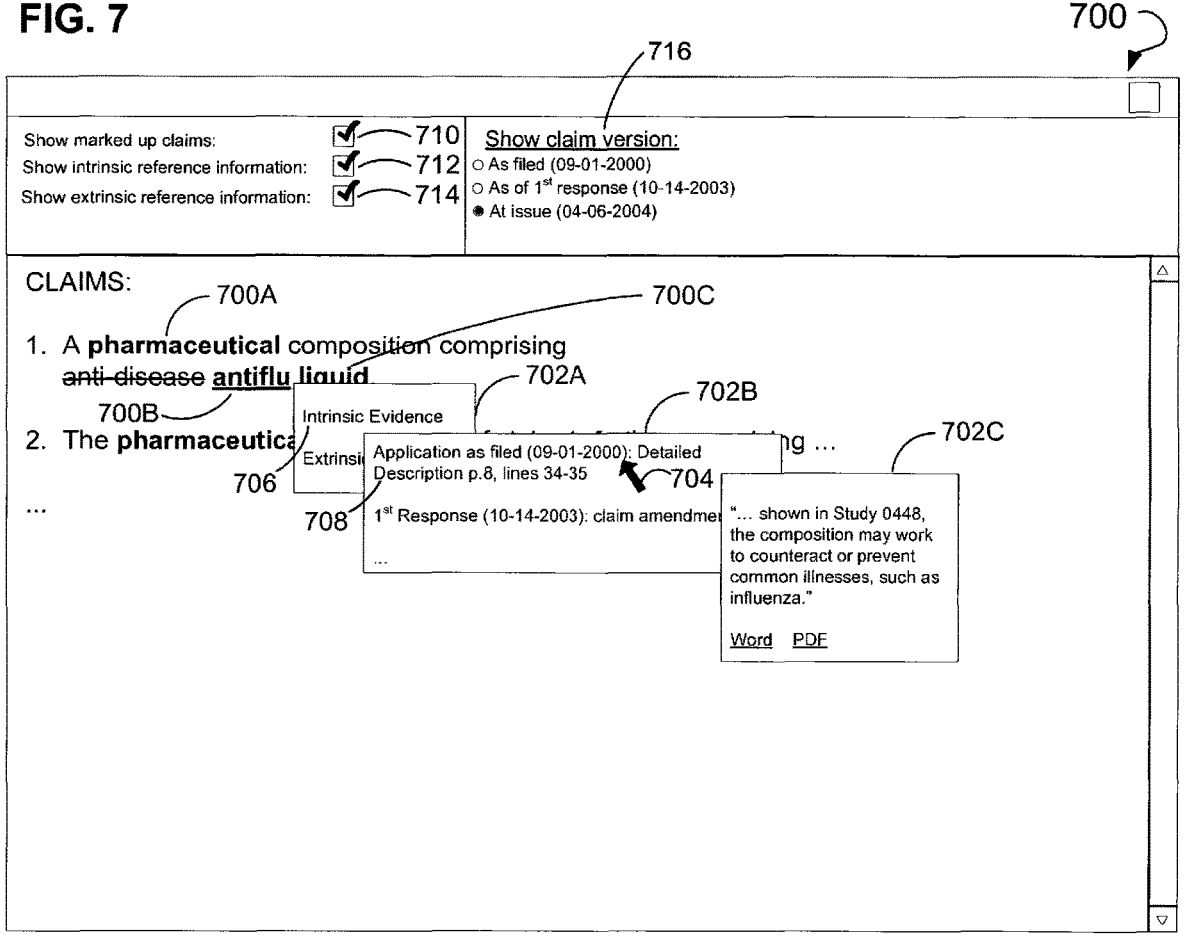
FIG. 7 illustrates a claim including three claim limitations in a configuration of a graphical user interface, according to an example embodiment.

In FIG. 7, an example claim is illustrated including three claim limitations 700A, 700B, 700C. In this example, claim limitations 700A, 700B, 700C are indicated using a bold font face. In addition, a group of hierarchical popup windows 702A, 702B, 702C are illustrated. In this example, three popup windows 702A, 702B, 702C are illustrated; however, in other embodiments, more or fewer windows may be used. For example, a single popup window may be implemented such that the contents of the popup window dynamically change in response to user input. The popup windows 702A, 702B, 702C as shown in this example may have been activated in a particular sequence, such as by first moving the cursor 704 over the claim limitation "antiflu" 700B, which may cause the first popup window 702A to present the primary evidence divisions (e.g., intrinsic and extrinsic); then moving the cursor 704 over the label "Intrinsic Evidence" 706, which may cause the second popup window 702B to present the available intrinsic evidence references or categories of intrinsic evidence references; and finally moving the cursor 704 over the label "Application as filed: Detailed Description" 708, which may activate the third popup window 702C, which may contain a link to or a portion of the Detailed Description that discusses, defines, provides exegesis for, or otherwise characterizes or explicates the claim limitation "antiflu" 700B. For example, the third popup window 702C may contain a portion of the Detailed Description that includes a description of the claim limitation and also some words before and after the relevant portion to put the passage in context. As another example, a link (e.g., hyperlink) may be provided that, when activated or actuated, may cause the display of a portion of the relevant Detailed Description, such as by using a bookmark action to scroll to the relevant portion. Links may be provided to one or more computer-readable formats, such as MICROSOFT WORD™, Adobe PDF™, plain text, or the like. In some embodiments, a user may copy the relevant portion shown in the third popup window 702C, such as for a copy and paste operation. Copy and paste operations may be used to provide more efficient construction of opinions or other documents.

Other elements shown in FIG. 7 include a control 710 to toggle on or off display of marked up claim language, a control 712 to toggle on or off display of intrinsic reference information, and a control 714 to toggle on or off display of extrinsic reference information. Using the control 710 to toggle marked up claim language allows a user to switch between a marked up view of the claims and a clean version of the claims. The marked up view may include one or more indications, as illustrated above, to differentiate insertions from deletions or other revisions. The clean version may include the current version of claims on file with the PTO or issued claims. In other embodiments, the user interface is configured such that a user is able to choose between one or more revisions of the claims displayed as a clean version (e.g., not marked up). For example, the clean version may represent one or more claims at a particular time during prosecution, such as the claims as originally filed, as presented in the first office action response, or as presented during appeal. In some embodiments, one or more controls 716 are provided to enable the user to change the active view to display the particular revision of claims. Examples of controls include hyperlinks, scripted controls, or form controls (e.g., radio buttons, check boxes, dropdown list, etc.). In other embodiments, rather than using a popup window, another portion of the user interface illustrated in FIG. 7 may be used to display the information otherwise illustrated as displayed in a popup window.

Figure 8:
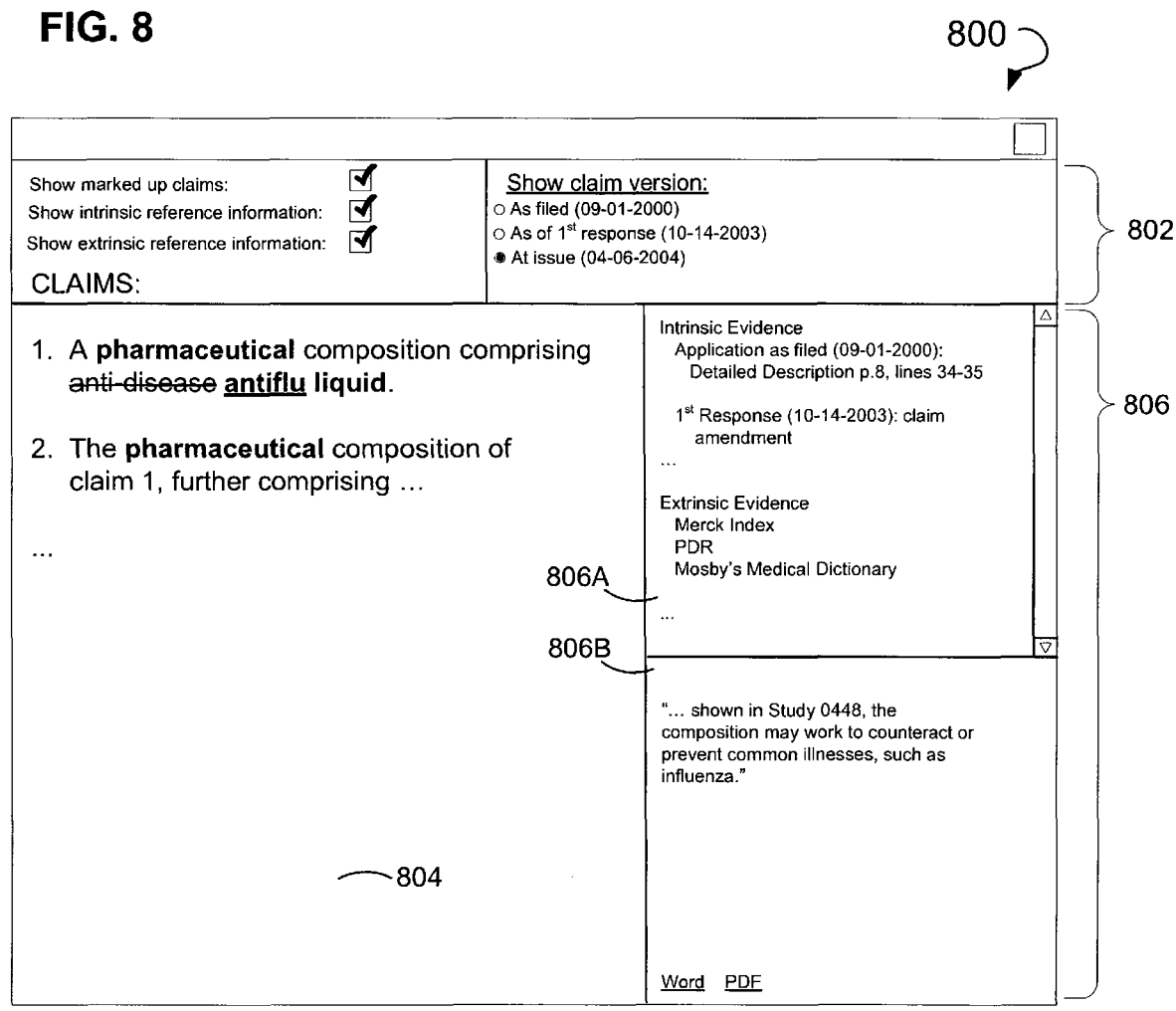
FIG. 8 illustrates another configuration of a Graphical User Interface (GUI) divided into two or more frames or sub-windows, including a main frame, a navigation frame, a claim content frame, and a reference content frame, according to an example embodiment.

FIG. 8 illustrates another example configuration of a graphical user interface divided into two or more frames or sub-windows, including a main frame 800, a navigation frame 802, a claim content frame 804, and a reference content frame 806. The navigation frame 802 may include controls to toggle views of claim markups, intrinsic information, or extrinsic information. In addition, the navigation frame 802 may include hyperlinks or other controls to navigate one or more revisions of claim sets. The claim content frame 804 may include a listing of displayed claims. The displayed claims may include markup indications or may be a clean copy of the claims. The reference content frame 806 may include navigational tools (e.g., a hierarchical hypertext menu) and may also include content related to intrinsic or extrinsic evidence. In some embodiments, the reference content frame 806 is further divided, such as into an upper portion 806A and a lower portion 806B, where one division or portion 806A is used to navigate reference content and another division or portion 806B is used to display reference content. Displayed reference content may be copied and pasted to another application, such as from the browser to a word processing application, to provide efficiencies. While FIG. 6 illustrates a method 600 to construct or present an interface to a user, FIGS. 7 and 8 illustrate screenshots of example embodiments of such interfaces.

Figure 9:
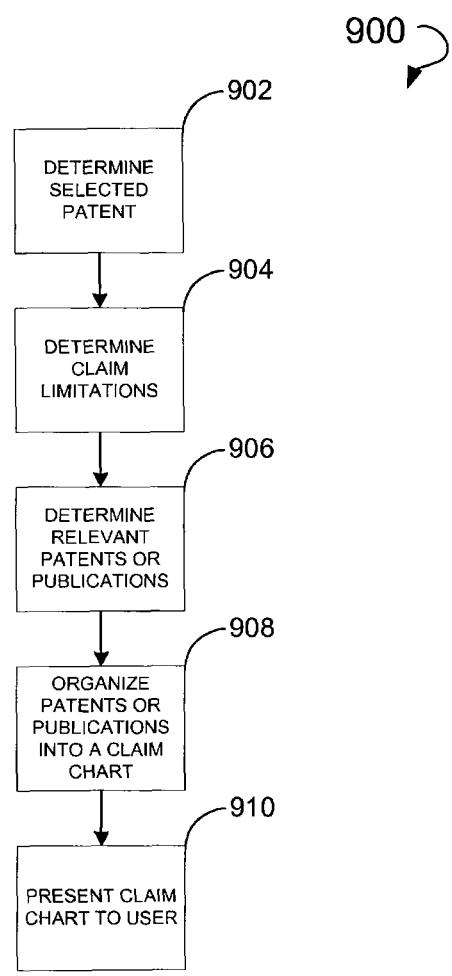
FIG. 9 is a flowchart illustrating a method of presenting a claim chart to a user, according to an example embodiment.

FIG. 9 illustrates a method 900 of presenting a claim chart to a user. Illustrated are a sequence of operations (e.g., 902, 904, 906, 908, and 910) that are used to implement the method 900. Data to construct the claim chart may be extracted from a data source in the patent reference system 101, such as the patent reference database 412. At 902, an operation is illustrated to select a patent. In some embodiments, a user may provide an indication of the selected patent, such as by inputting a U.S. patent Number in a dialog box or other text input affordance or by choosing a U.S. patent from a list of patents using a mouse or other input mechanism. In another embodiment, the patent reference system 101 may automatically extract patents from a data source, such as a configuration file, an input file, a networked database, or the like. For example, the patent reference system 101 may automatically connect to an online version of the Orange Book and choose one or more of the patents contained in the data source as a seed for the process.

At 904, an operation is illustrated to determine claim limitations related to the selected patent. In some embodiments, claim limitations may be available in the patent reference database 412 or other data source in a patent reference system, such as the patent reference system 101 illustrated in FIG. 4. When the patent is not available in the patent reference system 101, the patent claims are obtained, such as from one or more public data warehouses 418 or private data warehouses 420. Once the patent claims are received, they can be parsed to determine the recited claim limitations. In some embodiments, the claim limitations may be stored in a data store in the patent reference system 101, such as the patent reference database 412. In a further embodiment, the patent claims, specification, or figures may also be stored for future reference. In some embodiments, citations or links (e.g., URL's) to patent claims, specification, or figures may be stored in place of the full content.

At 906, an operation is illustrated that uses the extracted claim limitations, to determine relevant patents or publications and to store these patents and publications. Relevant patents or publications may be available in a data store in the patent reference system 101, such as in the patent reference database 412. In some embodiments, when an insufficient number of documents are available in the patent reference system 101, an external search is performed to obtain additional documents. The insufficient number may be zero or based on a threshold. The threshold may be user-configurable. Searching for relevant patents or publications may include such processes as keyword searching public or private databases (e.g., public data warehouse 418 or private data warehouse 420), retrieving patent applications or issued patents based on a similar U.S. patent classification (e.g., class or sub-class) from the USPTO's database or a mirror, or searching using synonyms of one or more search keywords. In some embodiments, synonyms for terms in claim limitations may be provided by a user. In a further embodiment, user-provided synonyms are stored, such as in the patent reference database 412, to be reused in later searches. In some embodiments, synonyms are retrieved from an external database. For example, an external synonym provider (e.g., public data warehouse 418 or private data warehouse 420) may store commonly used synonyms for drug names (e.g., chemical name, common name, trade name, drug name, generic name, etc.). By accessing the provider's database, the patent reference system 101 may implement a more comprehensive search for related patent documents and publications.

At 908, an operation is implemented to organize relevant patent documents or publications into one or more claim charts. Claim charts may be constructed to show a user various views of the information stored in the patent reference database 412. Examples of claim chart construction may include displaying references that disclose or suggest an associated claim limitation, displaying references that include one or more claim limitations or synonyms of claim limitations, displaying claims of references that include one or more related claim limitations, or displaying references and including methods of medical use, active ingredient, or additional operation. Such claim charts may be useful to determine infringement, determine validity of a patent, or evaluate the scope of freedom to operate in a field of patents.

At 910, an operation is illustrated to present one or more claim charts to a user. Claim charts may be presented to a user using a number of media, including an online GUI, a spreadsheet, an image, or other graphical presentation means. In addition, claim charts may be constructed using one or more standardized interface languages (e.g., XML, HTML) to enable cross-platform presentation.

Figure 10:
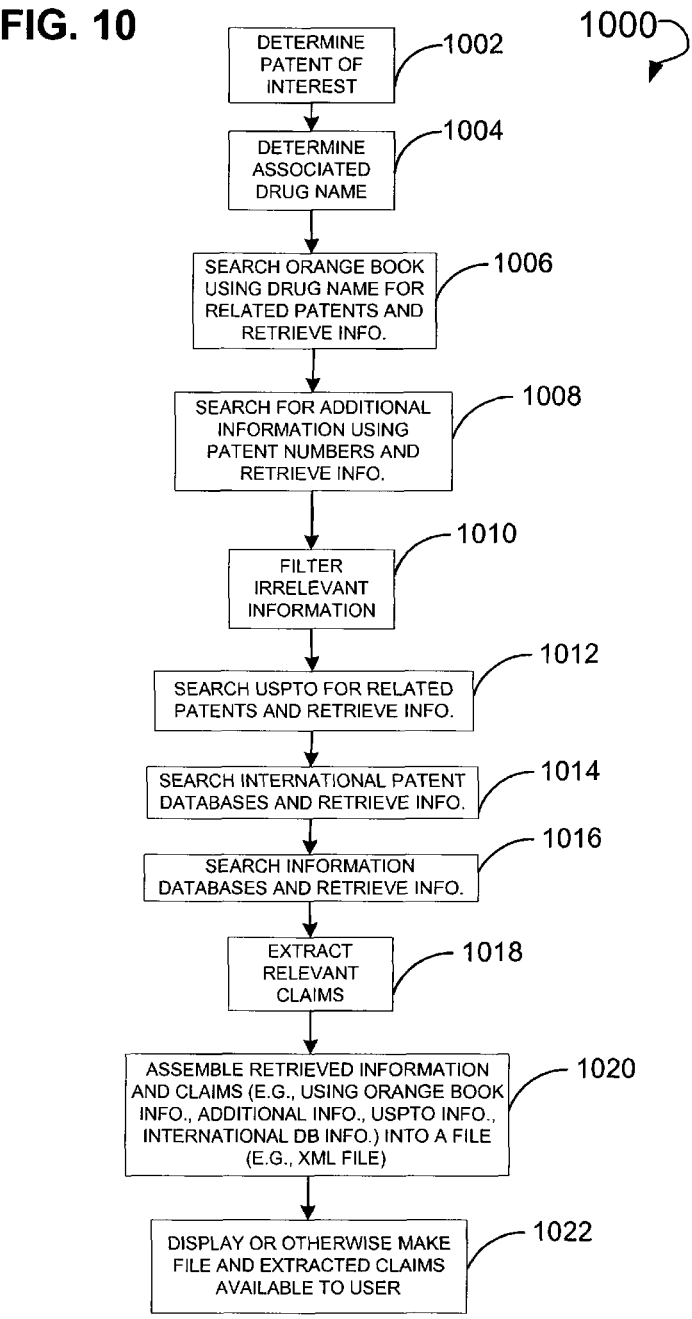
FIG. 10 is a flowchart illustrating a method for a pharmaceutical-based example of assembling and using relevant reference material, according to an example embodiment.

FIG. 10 is a flowchart 1000 illustrating a pharmaceutical-based example of assembling and using relevant reference material. Illustrated are a number of operations (e.g., 1002, 1004, 1006, 1008, 1010, 1011, 1012, 1013, 1014, 1015, 1016, 1017, and 1018) that are used to implement the method 1000. As a threshold matter, while these operations illustrate various functionality associated with data in the chemical and biotech. arts, as previously illustrated these operations may also be used to process data arising from other fields of art such as the electrical and software arts. For example, in lieu of searches being conducted of the Orange Book Web site using drug names, a search may be conducted of the IEEE or ACM Web site using the name of an algorithm or piece of software.

At 1002, a patent of interest is identified. Using the patent, a drug name of interest is identified through the implementation of operation 1004. For example, if a user is attempting to evaluate the validity or position of infringement of a pharmaceutical patent, the drug name may include the primary operation of the patent. Using the drug name, a regulatory database (e.g., the Orange Book) may be searched and information retrieved via the implementation of an operation 1006 to produce related patents. Related patents may include patents in a "patent family" (e.g., parents or descendents based on continuation, divisional, or other related applications). In addition, periods of exclusivity may also be collected. The related patents provide additional search criteria for further searching of other data sources, such as the ANDA filings or other technical information databases. At 1008, an operation is illustrated such that the related patent numbers are used to search and information retrieved from these sources for additional drug filings, drug, formulation, or ingredient information. The combined collection of search results (e.g., retrieved information) from block 1006 and block 1008 is filtered or "scrubbed" at 1010, such as to remove irrelevant information with regard to one or more claim limitations included in the identified patent from block 1002. Filtering may include actions such as removing duplicate search terms, consolidating search terms, determining synonyms of search terms, comparing search terms to terms found in the patent of interest or its claims, or other steps to pare down terms to a core of relevant search terms.

The relevant search terms may then be used in one or more progressive searches, such as to search the USPTO (see e.g., operation 1012) for additional U.S. patents or patent applications not found in the Orange Book, search international patent databases (see e.g., operation 1014) for relevant non-U.S. patents or patent applications, or search information databases (e.g., technical database or the World Wide Web) for relevant non-patent literature (see e.g., operation 1016). The relevant patents obtained from searches of domestic 1012 or international 1014 databases may be further processed by extracting relevant claims via the implementation of operation 1018. Relevant claims may include claims that recite the composition or formulation of an active ingredient, including those that include a drug carrier, methods of manufacturing the active ingredient in the drug, methods of manufacturing the active ingredient in the drug, methods of using the active ingredient (e.g., methods of treatment), or specific formulations of the active ingredient (e.g., formulations including a salt, solvate, polymorph, or metabolite of the active ingredient, or a pro-drug of the active ingredient). The augmented collection of information from the various sources may be stored in the patent reference system 101, such as in the patent reference database 412. Once the relevant claims are extracted, an operation 1020 is carried out that assembles retrieved information into a file, data stream, or the like. Further, the operation 1020 may assemble the retrieved information and extracted relevant claims, and to place this information and extracted claims into some type of file (e.g., an XML based file) for future use or display. As reflected in the implementation of operation 1022, portions of the U.S. patents and applications, non-U.S. patents and applications, and non-patent literature may be presented to a user in one or more forms, as illustrated herein, including clean claims, marked up claims, and various versions of claim charts.

FIG. 11 illustrates some embodiments of a user interface to display claims and relevant references associated with claim limitations within each claim. To illustrate this embodiment, an example patent, U.S. Pat. No. 5,070,877, is presented. In FIG. 11, claim limitations 1100A, 1100B, 1100C are shown. In some embodiments, claim limitations 1100A, 1100B, 1100C are delimited using a special character or set of characters. For example, in the example illustrated, limitations are delimited using left and right angle brackets, (e.g., '<' and '>'). Use of textual marking may be advantageous on systems that are incapable of producing or presenting text font modifications, such as bold, italic, or the like. In a dynamic user environment, claim limitations 1100A, 1100B, 1100C may be implemented to programmatically respond to one or more user actions, such as a mouse movement or click or a keyboard command. When the user activates or actuates a claim limitation 1100A, 1100B, 1100C, for example by moving a cursor over a selected limitation, a popup window 1102 may be presented. In the example configuration, shown in FIG. 11, the popup window 1102 includes a collapsible hierarchal menu 1104 with one or more intrinsic or extrinsic references 1106A, 1106B, 1106C and controls (e.g., hyperlinks) 1108A, 1108B to view one or more electronic formats of each reference. For example, controls 1108A, 1108B may include a hyperlink to a word processing document, an image, or other viewable or editable representation of at least the relevant portion of the associated reference. In this example configuration, hyperlinked images are presented that, when activated, open or access a .pdf or MICROSOFT WORD™ formatted document, depending on the hyperlink used. Once a document or other file is opened or accessed, the user may view, copy, edit, or otherwise manipulate the document or file.

FIGS. 12 and 13 illustrate various embodiments of claim charts that may be generated using data collected and stored in a patent reference system 100 using systems and methods illustrated herein. FIG. 12 illustrates a portion of claim chart organized to illustrate references (e.g., patents or publications) that disclose or suggest an associated claim limitation. In the claim chart 1200 illustrated in FIG. 12, claim limitations from claims associated with the patent of interest, U.S. Pat. No. 5,070,877, are arranged across the top of the chart, each limitation forming a column. References related to the patent, such as references found as a result of a search illustrated in FIG. 10, are arranged such that each reference forms a row in the claim chart 1200. Citations to one or more portions of a reference that disclose, illustrate, teach, or suggest a particular claim limitation is included in the appropriate table cell.

FIG. 13 is a portion of a claim chart 1300 organized to illustrate references that contain one or more claims that contain a keyword or other related term. In this example, patents having claims that recite calcipotriol, a composition or formulation of calcipotriol (e.g., methods of medical treatment), specific slats, solvates or polymorphs of calcipotriol, or metabolites or pro-drugs of calcipotriol are arranged into rows including the patent number 1302, relevant claims 1304, and description of coverage 1306. The example claim chart 1300 also includes references that do not recite the pertinent claim limitation, for example references 1 and 3-6.

FIGS. 14-16 illustrate various embodiments of "freedom to operate" (FTO) charts that may be generated using data collected and stored in a patent reference system 101 using systems and methods illustrated herein. FIG. 14 is a portion of a FTO chart 1400 including U.S. patent documents having claims that pose freedom to operate concern for design-around formulation of METROGEL® (metronidazole gel). In particular, FIG. 14 provides example U.S. patent documents having claims that recite metronidazole for use in methods of medical treatment other than rosacea. FIG. 14 includes the relevant U.S. patent document 1404 and the associated illustrated method of medical use 1402 and the associated illustrated method of medical use 1404.

FIG. 15 illustrates a portion of a FTO chart 1500 including example U.S. patent documents having claims that recite metronidazole, in combination with another active agents and/or ingredients, for use in methods of medical treatment other than rosacea. FIG. 15 includes the relevant U.S. patent document 1504 and the associated illustrated method of medical use 1502, and the associated illustrated method of medical use 1504.

FIG. 16 illustrates a portion of a FTO chart 1600 including example U.S. patent documents having claims that recite a formulation that includes metronidazole, in combination with at least one other operation. FIG. 16 includes the relevant U.S. patent documents 1604.

FIGS. 17-20 illustrate examples of screenshots of a search and report interface that uses a patent reference system (e.g., 101 in FIG. 4). In embodiments, the screens illustrated in FIGS. 17-21 may be implemented using a Web browser (e.g., Netscape or Internet Explorer) or other client program.

FIG. 17 illustrates an example of a directory screen 1700 (e.g., homepage). The directory screen includes one or more links to reference information, such as a link to an annual edition of the Orange Book 1702, a link to cumulative supplements of the Orange Book 1704, a link to U.S. patents listed in the Orange Book 1706, and a link to FDA approved products listed in the Orange Book 1708. A user may activate (e.g., click) a link to display the corresponding information. For example, activating the link to the annual edition of the Orange Book 1702 may navigate the user to an electronic copy of the Orange Book, such as in PDF™ or MICROSOFT WORD™ format. Similarly, activating the link to cumulative supplements of the Orange Book 1704 may navigate the user to electronic copies of supplements to the Orange Book. In embodiments, the electronic copies may include PDF™ format, MICROSOFT WORD™ format, plain text format, or the like. Electronic copies may be searchable by the user, such as using a searchable .pdf format. Activating the link to U.S. patents listed in the Orange Book 1706 may, in one embodiment; navigate the user to a screen listing the patents contained in a particular edition of the Orange Book. The screen listing may be sorted or ordered by date, patent number, drug information, assignee information, or other categorizations. In some embodiments, the screen listing may include a link to an electronic copy of the corresponding patent. The electronic copy may be in .pdf format, MICROSOFT WORD™ format, an image format (e.g., .png, .gif, .jpg) or other formats compatible with a Web browser or client program. Similarly, activating the link to FDA approved products listed in the Orange Book 1708 may navigate the user to one or more screens displaying product information.

In addition to the navigation links 1702-1708, the directory screen 1700 includes a search input control 1710. The search input control 1710 may be implemented as an HTML form control in some embodiments. The user may provide one or more search strings and activate the "submit" control 1712 to initiate the search. In some embodiments, the search's domain includes the annual edition of the Orange Book, any cumulative supplements to the Orange Book, and a patent reference database (e.g., 412 in FIG. 4). When a user submits a search, one or more fields may be automatically searched, such as active pharmaceutical ingredient (e.g., chemical name), proprietary name (e.g., trademarked name), molecular formula, names of any commercially marketed formulations having the specified active ingredient, indication of use, sales of drug (e.g., $USD per year), type of formulation (e.g., gel, lotion, ointment), route of administration (e.g., topical, oral, IV, IP, rectal, buccal), patent holder (e.g., assignee, licensee), marketing company (NDA/ANDA Holder), application number (FDA), patent number, claim terms, patent expiration date, or FDA period of exclusivity. In some embodiments, a user may be provided one or more controls, such as HTML form controls, to select or choose which of the one or more fields to search.

Finally, an example run report control 1714 is displayed on the directory screen 1700. By activating the run report control 1714 a user may generate a formatted report, such as illustrated in more detail below, using one or more search terms provided in the search input control 1710.

FIG. 18 illustrates an example of a search results screen 1800 that may be displayed to the user as a result of executing a search using the search input control 1710 and the submit control 1712. The search results screen 1800 provides the user a formatted list of documents, or portions of documents that match the search query (e.g., search terms in a particular search domain). The example illustrated in FIG. 18 displays the results of a search for "testosterone." As illustrated, patents retrieved from entries found in the Orange Book related to the search term "testosterone" are presented in the search results. Additionally, references related to the patent documents found are also presented. In embodiments, a search engine may search the Orange Book, the cumulative supplement to the Orange Book, or other sources, such as the patent reference database 412 to compile the search results. In the example shown, each search result title is presented as a link (e.g., hyperlink), which a user may actuate or activate (e.g., click or mouse over). Upon activation, the user may be navigated to or presented with, such as in a popup window or other user interface mechanism, the document cited in the search results. In some embodiments, a dynamic popup window may be presented when the user move the cursor over the title of a search result. The dynamic popup window may contain more information about the cited reference, such as the patent applicant, assignee, expiration date, cited references, other references, office actions or other PTO correspondence, an expanded passage where the search term was found, or other details about the reference. The dynamic popup window may be activated by the user to navigate to the particular related document, document section, or present other information represented in the window. In some embodiments, activating a term in a dynamic popup window may execute an additional search using the indicated term. For example, when a user moves the cursor over the search result of U.S. Pat. No. 5,152,997 1802, a dynamic popup window 1804 may be presented. When a user activates a term, such as the assignee "Theratech, Inc." a search may be initiated using the activated term.

In some embodiments, when a search is detected to possibly return a large number of results, the user may be notified of such a condition and be provided a control to terminate the search. FIG. 19 illustrates an example of a search in progress screen 1900. The search in progress screen 1900 may be programmatically set to appear when a threshold number of results are determined to exist. For example, when over 1,000 results are found, a user may be presented with the search in progress screen 1900, where the user may terminate the search or allow it to continue. In the example shown, in response to an interrupted search, a user may activate a continue control 1902, a stop and view control 1904, or a terminate search control 1906. If the user activates the continue control 1902, the search may continue to its normal completion, possibly returning a large number of search results. If the user activates the stop and view control 1904, the search may immediately cease operation and the user may be presented with the results found at the point when the search was ceased. If the user activates the terminate search control 1906, the search may be canceled and, in one example, the user may be provided a search input control to provide additional search terms for a successive search.

After performing one or more searches, a user may determine a particular drug of interest. FIG. 20 illustrates an example of a report generation screen 2000. In some embodiments, using the run report control 1714 in FIG. 17, the user may navigate to the report generation screen 2000. The user may enter a particular drug name in the search input control 1710 in FIG. 17. The system can then use the provided drug name to perform a background search of the patent reference database 412. The user is then presented with the report generation screen 2000 and can check one or more detail checkboxes 2002 to indicate what information to include in the report. After selecting the desired output options, the user can activate the submit control 2004 to initiate the report generation. Report output may be in a tabular, list, or other format. The output may include links to documents, (e.g., .pdf documents, spreadsheet documents) or plain text. In some embodiments, .pdf documents are in a searchable text format. In some embodiments, when information is incomplete regarding a particular detail, the detail checkbox and description may be presented differently to indicate to the user that the option is not available in the report. For example, in FIG. 20, the dosages detail control 2006 is disabled and indicated as such using italic font. In other examples, other font effects or user interface indications, such as a grayed-out font or control may be used.

In some embodiments, the system and method illustrated herein may provide a user with multiple ways to search a dynamically linked database of patent reference information; provide intelligent filtering, categorization, and organization of patent information from disparate sources; and provide a powerful and flexible reporting feature.

In the examples and embodiments illustrated above, the references, whether associated with a claim limitation manually, automatically, or by some combination thereof, may all be useful in a variety of applications. Certain processes may be largely automatic, such as where data, related to a pharmaceutical name, is automatically collected by a program or other automated agent. Other processes may include manual processes, such as search techniques used to find relevant business method patents, which are typically more abstract and may use less standardized language.

The evidence regarding the meaning and scope of claim limitations is useful to patent attorneys and others for a multitude of purposes, including determination of the scope or extent of a patent, which may be used to determine patent validity, questions of infringement, or patent value. These determinations are examples of what are often investigated when patent attorneys draft opinions or opinion letters. For example, a person marketing an invention may wish to have the validity of another inventor's patent covering the new product investigated, in hopes that the patent may be found to be invalid for some reason. As another example, a patent owner assessing whether to assert a patent against a potential infringer may wish to confirm the validity of the patent before contacting the potential infringer regarding licensing fees or possible litigation.

Formal opinions regarding patent infringement can be particularly valuable, as a party having an opinion issued in good faith indicating a particular method, article, or composition does not infringe another's patent is generally shielded from triple or treble damages for willful infringement should the party later be found to infringe the other's patent. Similarly, the party wishing to assert a patent may often investigate not only the validity of their own patent before asserting it, but may also obtain an infringement opinion to determine whether the suspected infringing product in question is in fact infringing on the patent to be asserted.

In various embodiments, extraction and organization of claim limitations and related intrinsic and extrinsic evidence may provide one or more advantages to users (e.g., patent attorneys), such as assisting in determination of the scope or extent of a patent to evaluate validity, infringement, or patent value. Such evaluations may be useful when forming legal opinion, considering lawsuits, or assessing licensing opportunities.

In some embodiments, a method is illustrated as including receiving a search query (see e.g., operation 502), the search query relating to a patent, retrieving (see e.g., operations 508-518) data relating to a term contained in a claim limitation in the patent, the data including at least one of intrinsic or extrinsic evidence associated with the term by a hyperlink, and displaying the claim limitation and the hyperlink (see e.g., operation 910). In some embodiments, the hyperlink includes a mechanism to present a popup menu containing a plurality of references defining the term contained in the claim limitation. Additionally, the popup menu may display the intrinsic evidence. A further hyperlink to an electronic document containing the intrinsic evidence may also be displayed. The popup menu may also display extrinsic evidence. Also, a further hyperlink to an electronic document containing the extrinsic evidence may also be displayed. The hyperlink may include a mechanism to present a first popup menu containing the intrinsic evidence, and a second popup menu containing the extrinsic evidence. Moreover, the intrinsic evidence may include at least one of a specification of the patent in which the claim limitation appears, another claim of the patent, or a prosecution history of the patent. The extrinsic evidence may include at least one of a publication, another patent, expert testimony, testimony of an inventor on the patent, or a dictionary definition.

Example Storage

Some embodiments may include storage operations (e.g., patent reference database 412) that facilitate the storage of data wherein tables of data are created, and data is inserted into, and/or selected from, these tables using Structured Query Language (SQL), Multidimensional Expressions (MDX) language, or some other database-related language known in the art. These tables of data can be managed using a database application such as, for example, MYSQL™, SQLSERVER™, Oracle 8I™, 10G™, MICROSOFT ANALYSIS SERVICES™, or some other suitable database application. These tables may be organized into a Relational Data Schema (RDS), Object-Relational-Database Schemas (ORDS), a Multidimensional Cube used in On Line Analytical Processing (OLAP), or some suitable architecture. These schemas may be normalized using certain normalization algorithms so as to avoid abnormalities such as non-additive joins and other problems. Additionally, these normalization algorithms include Boyce-Codd Normal Form (BCNF) or some other normalization or optimization algorithm known in the art. In some embodiments, these tables are data files to be manipulated and managed by, for example, the above referenced applications.

Figure 21:
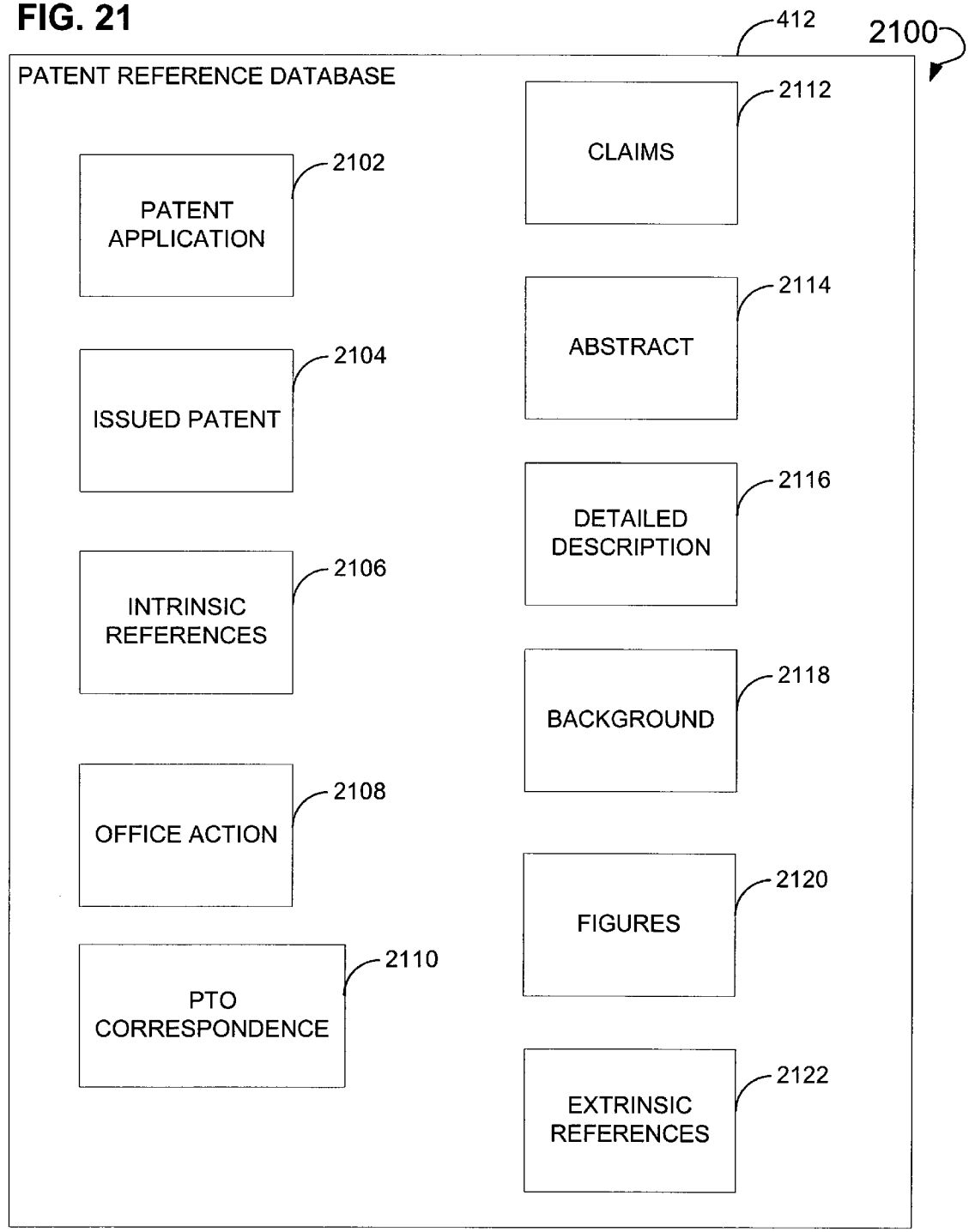
FIG. 21 illustrates a data structure for storing patent-related information, according to an example embodiment.

FIG. 21 illustrates an example of a data structure 2100 for storing patent-related information as may reside as part of, for example, patent reference database 412. In some embodiments, the patent reference database 412 may include a patent application file 2102, an issued patent file 2104, an intrinsic references file 2106, an office action file 2108, a PTO correspondence file 2110, a claims file 2112, an abstract file 2114, a detailed description file 2116, a background file 2118, a figures file 2120, and an extrinsic references file 2122.

The patent application file 2102 may be structured to store one or more details related to one or more pending published patent applications. For example, the patent application file 2102 may include one or more fields, such as a title field, a publication date field, an application date field, an application serial number field, an assignee identification field, a U.S. classification field, an international classification field, an inventor identification field, or a foreign priority field.

The issued patent file 2104 may be structured to store one or more details related to one or more issued patents. For example, the issued patent file 2104 may include one or more fields, such as a title field, a publication date field, an issued date field, an application date field, an application serial number field, an assignee identification field, a U.S. classification field, an international classification field, an inventor identification field, a primary examiner identification field, a secondary examiner identification field, a PCT information field, an attorney or agent field, or a foreign priority field.

The intrinsic reference file 2106 may be structured to store one or more details related to intrinsic references. In some embodiments, the intrinsic reference file 2106 includes one or more database tables, which may be linked, such as with a primary/foreign key relationship in a relational database scheme, to one or more tables in the patent application file 2102 or to one or more tables in the issued patent file 2104. One or more tables may be included in the intrinsic reference file 2106 to store one or more references cited during prosecution, one or more office actions or office action responses, one or more affidavits filed by the applicant or examiner, one or more records or telephonic or in-person examiner interviews, or other paper filed by the applicant or examiner.

The office action file 2108 may be structured to store one or more details related to one or more office actions related to a particular patent application or issued patent. The office action file 2108 may include one or more fields, such as a type of office action field, a primary examiner identification field, a secondary examiner identification field, a mailed date field, a patent application reference field (e.g., an application serial number or an attorney docket number), or links to previous or subsequent office actions in a chain of office actions related to a particular patent application or issued patent.

The PTO correspondence file 2110 may be structured to store one or more details related to miscellaneous PTO correspondence related to a particular patent application or issued patent. For example, correspondence related to issuance notification, maintenance fees, status information, interferences, or other papers submitted to or received from the PTO.

The claims file 2112 may include structure to store one or more details related to claims of a particular patent application or issued patent. The claims file 2112 may include one or more fields, such as type of claim (e.g., method, apparatus), parent-child relationships among two or more claims, claim limitations, or claim preamble. The claims file 2112 may be associated with one or more of: the patent application file 2102, issued patent file 2104, intrinsic references file 2106, or the office action file 2108, in various embodiments. For example, claims presented in a particular office action response may be stored in the claims file 2112. As another example, claims, or portions thereof, may be stored and associated with a particular intrinsic reference (e.g., cited patent). In addition, the claims file 2112 may be associated with one or more of the abstract file 2114, the detailed description file 2116, the background file 2118, or the figures file 2120. For example, a particular claim limitation may be related (associated) with a figure, or portion of a figure, as stored in the figures file 2120, where support for the particular claim limitation may be found.

The abstract file 2114 may include structure to store one or more details related to an abstract section of a patent application or issued patent. Likewise, the detailed description file 2116 and the background file 2118 may include one or more fields to store the content of the respective section of a patent application or issued patent. For example, text, tables, in-line figures, mathematical formulae, chemical diagrams, schematic diagrams, or other portions of the background or detailed description of a particular patent may be stored, either separately or combined, in the detailed description file 2116 and/or the background file 2118.

The figures file 2120 may include structure to store one or more details related to one or more figures of a patent application or issued patent. For example, the figures file 2120 may store images (e.g., .tiff, .png, .pdf, or some other suitably formatted image file) of one or more figures. As another example the figures file 2120 may include text illustrating a particular figure. As another example, the figures file 2120 may include a standardized description of one or more figures, for example using an XML file format for drawings, such as .vdx VISIO™ files as provided by Microsoft, Inc.

The extrinsic reference file 2122 may include structure to store one or more details related to one or more extrinsic references related to a patent application or issued patent, such as one stored in patent application file 2102 or issued patent file 2104. The extrinsic reference file 2122 may include one or more fields, such as a title, a date of publication, a cite, a cited portion (e.g., the text corresponding to the cite), an author, a publication source, or the like. Because extrinsic references may be cited by more than one patent application or issued patent, the extrinsic reference file 2122 may be related (associated) with the patent application file 2102 and/or the issued patent file 2104, in various embodiments.

In embodiments, one or more database files 2102-2122 may be structured as one or more tables in a relational database. For example, the patent application file 2102 may be structured to include an assignee table and an inventor table, which may include details about the assignee or inventor, such as name, address, citizenship, or the like. The assignee table and/or the inventor table may be linked using a primary/foreign key relationship with a patent application table to create a normalized database structure. The assignee table and/or the inventor table may further be linked to other tables, such as an issued patent table in the issued patent file 2104 or an intrinsic reference table in the intrinsic reference file 2106.

The database files illustrated above are for illustrative purposes only. In various embodiments, other fields may be used or some fields may not be included depending on the use and structure needed for the database.

Figure 22:
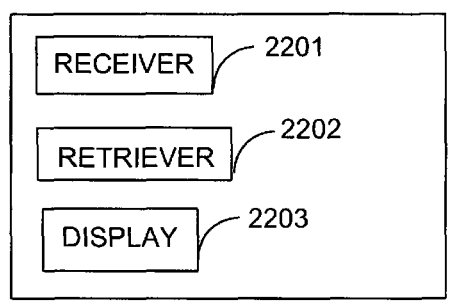
FIG. 22 is a block diagram of a patent reference system, according to an example embodiment.

FIG. 22 is a block diagram of an example patent reference system 101. In some embodiments, these blocks may be implemented in hardware, firmware, or even as software (e.g., as software operations with the below illustrated functionality). Illustrated is a computer system comprising a receiver 2201 to receive a search query, the search query relating to a patent, a retriever 2202 to retrieve data relating to a term contained in a claim limitation in the patent, the data including at least one of intrinsic or extrinsic evidence associated with the term by a hyperlink, and a display 2203 to display the claim limitation and the hyperlink. Further, the hyperlink may include a mechanism to present a popup menu containing a plurality of references defining the term contained in the claim limitation. Additionally, the popup menu may display the intrinsic evidence. Some embodiments may include the display 2203 used for displaying a further hyperlink to an electronic document containing the intrinsic evidence. Additionally, the popup menu may display extrinsic evidence. Example embodiments may include the display 2203 used for displaying a further hyperlink to an electronic document containing the extrinsic evidence. Moreover, the hyperlink may include a mechanism to present a first popup menu containing the intrinsic evidence, and a second popup menu containing the extrinsic evidence. The intrinsic evidence may also include at least one of a specification of the patent in which the claim limitation appears, another claim of the patent, or a prosecution history of the patent. In addition, the extrinsic evidence may include at least one of a publication, another patent, expert testimony, testimony of an inventor on the patent, or a dictionary definition.

Component Design

Some example embodiments may include the above illustrated methods being implemented as software modules or operations. Common too many of these components (e.g., operations) is the ability to generate, use, and manipulate the above-illustrated data and data sets. These operations, and associated functionality, may be used by the client, server, or peer applications. These various operations can be implemented into the system on an as-needed basis. These operations may be written in an object-oriented-computer language such that a operation oriented or object-oriented programming technique can be implemented using a Visual Operation Library (VCL), Operation Library for Cross Platform (CLX), Java Beans (JB), Java Enterprise Beans (EJB), Operation Object Model (COM), or Distributed Operation Object Model (DCOM) or other suitable technique. These operations are linked to other operations via various Application Programming Interfaces (APIs) and then compiled into one complete server and/or client application. The process for using operations in the building of client and server applications is well known in the art. Further, these operations, and the tiers that they make up, are linked together via various distributed programming protocols as distributed computing components.

Distributed Computing Components

Some example embodiments may include the previously illustrated components (e.g., operations) being implements across a distributed programming environment. For example, operations providing logic functionality may reside on a first computer system that is remotely located from a second computer system containing an Interface or Storage functionality. These first and second computer systems can be configured in a server-client, peer-to-peer, or some other configuration. These various levels can be written using the above illustrated operation design principles and can be written in the same programming language, or a different programming language. Various protocols are implemented to enable these various levels, and operations contained therein, to communicate regardless of the programming language used to write these operations. For example, a module written in C++ using the Common Object Request Broker Architecture (CORBA) or Simple Object Access Protocol (SOAP) can communicate with another remote module written in Java. These protocols include SOAP, CORBA, or some other suitable protocol. These protocols are well-known in the art.

A System of Transmission Between a Server and Client

In some embodiments, the above illustrated operations that make up the platform architecture communicate using the Open Systems Interconnection Basic Reference Model (OSI) or the Transmission Control Protocol/Internet Protocol (TCP/IP) protocol stack models for defining network protocols that facilitate the transmission of data. Applying these models, a system of data transmission between a server and client computer system can be illustrated as a series of roughly five layers comprising as a: physical layer, data link layer, network layer, transport layer and application layer. Some example embodiments may include the various levels (e.g., the Interface, Logic and storage levels) residing on the application layer of the TCP/IP protocol stack. The present application may utilize HTTP to transmit content between the server and client applications, whereas in other embodiments another protocol known in the art is used. Content from an application residing at the application layer is loaded into the data load field of a TCP segment residing at the transport layer. This TCP segment also contains port information for a recipient application or a module residing remotely. This TCP segment is loaded into the data field of an IP datagram residing at the network layer. Next, this IP datagram is loaded into a frame residing at the data link layer. This frame is then encoded at the physical layer and the content transmitted over a network such as the Internet, Local Area Network (LAN) or Wide Area Network (WAN). The term Internet refers to a network of networks. Such networks may use a variety of protocols for exchange of information, such as TCP/IP etc., and may be used within a variety of topologies or structures. This network may include a Carrier Sensing Multiple Access Network (CSMA) such as an Ethernet-based network. This network may include a Code Division Multiple Access (CDMA) network or some other suitable network.

A Computer System

Figure 23:
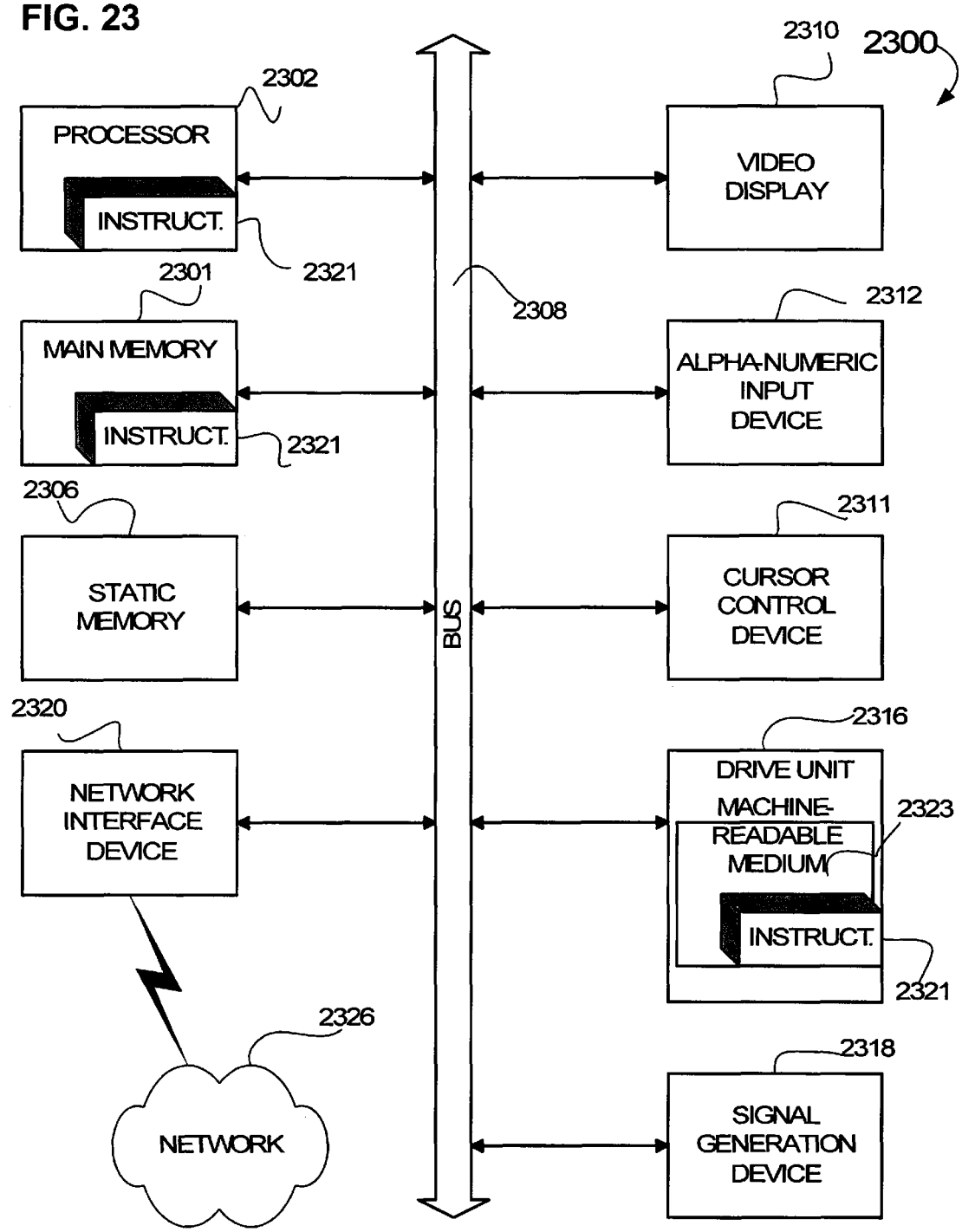
FIG. 23 illustrates a computer system, according to an example embodiment.

FIG. 23 shows a diagrammatic representation of a machine in the example form of a computer system 2300 within which a set of instructions for causing the machine to perform any one or more of the methods, processes, operations, or methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 2300 includes a processor 2302 (e.g., a Central Processing Unit (CPU), a Graphics Processing Unit (GPU) or both), a main memory 2301 and a static memory 2306, which communicate with each other via a bus 2308. The computer system 2300 may further include a video display unit 2310 (e.g., a Liquid Crystal Display (LCD) or a Cathode Ray Tube (CRT)). The computer system 2300 also includes an alphanumeric input device 2312 (e.g., a keyboard), a User Interface (UI) cursor controller 2311 (e.g., a mouse), a disk drive unit 2316, a signal generation device 2318 (e.g., a speaker) and a network interface device 2320 (e.g., a transmitter).

The disk drive unit 2316 includes a machine-readable medium 2323 on which is stored one or more sets of instructions and data structures (e.g., software) embodying or used by any one or more of the methodologies or functions illustrated herein. The software may also reside, completely or at least partially, within the main memory 2301 and/or within the processor 2302 during execution thereof by the computer system 2300, the main memory 2301 and the processor 2302 also constituting machine-readable media.

The instructions 2321 may further be transmitted or received over a network 2326 via the network interface device 2320 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

In some embodiments, a computerized patent claim reference system is illustrated including a claim limitation listing showing one or more claim limitations of at least one claim of a patent; and at least one hyperlink, each hyperlink linking one of the claim limitations to one or more references defining the claim limitation, wherein the claim limitation listing comprises one or more claims. Further, the system is illustrated as having the one or more claims comprise each independent claim of the patent. Moreover, the system is illustrated as possibly having the one or more claims comprise each issued claim of the patent. Additionally, the system is illustrated as having at least one hyperlink comprises a mechanism to present a popup menu of a plurality of references defining the claim limitation. Furthermore, the system is illustrated as having at least one hyperlink that may comprise a list of types of references defining the claim limitation. The system is further illustrated wherein the one or more references defining the claim limitation comprise at least one of extrinsic or intrinsic evidence. In addition, the system is further illustrated wherein extrinsic evidence comprises one or more of: one or more publications, one or more other patents, one or more testimony of experts, a testimony of the inventor, or one or more dictionary definitions. Further, the system is illustrated as possibly having an intrinsic evidence list that comprises a specification of the patent, one or more claims of the patent, or a prosecution history of a patent. Moreover, the system is illustrated as potentially having a Web server operable to present the claim limitation listing and hyperlinks to a user via a Web browser.

A method of storing patent reference data, including storing one or more claim limitations of at least one claim of a patent, and storing at least one hyperlink, each hyperlink linking one of the claim limitations to one or more references defining the claim limitation. The method of storing patent reference data may further include storing the one or more references defining the claim limitation, wherein the one or more references defining the claim limitation comprise at least one of extrinsic or intrinsic evidence. Additionally, the method may further include having the claim limitations and at least one hyperlink stored on a Web server system operable to present the claim limitation listing and hyperlinks to a user via a Web browser. Further, the method may include presenting claim limitations of at least one claim of a patent as a hyperlink, the hyperlink from the claim limitation linking to one or more references defining the claim limitation, wherein the hyperlinks comprise popup menus of references defining the claim limitation. Moreover, the method may include having the hyperlinks comprise references defining the claim limitations sorted by reference type, wherein the one or more references defining the claim limitation comprise at least one of extrinsic and intrinsic evidence.

In some embodiments, a machine-readable medium with instructions stored thereon is illustrated, the instructions when executed operable to cause a computerized system to store one or more claim limitations associated with one or more claims of a patent, and store one or more hyperlinks, each hyperlink linking one of the claim limitations to one or more references associated with the claim limitation.

Example embodiments may include a machine-readable medium with instructions stored thereon, the instructions when executed operable to cause a computerized system to present claim limitations of at least one claim of a patent as a hyperlink, the hyperlink of the claim limitation linking to one or more references defining the claim limitation.

It is to be understood that the above description is intended to be illustrative, and not restrictive. For example, the above-illustrated embodiments (and/or aspects thereof) may be used in combination with each other. Many other embodiments may be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. It is submitted with the understanding that it may not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
   maintaining a patent reference database, the patent reference database storing a plurality of patent records, wherein a respective patent record identifies intrinsic evidence for claim limitations of claims of the respective patent record;
   presenting a user interface comprising:
      a patent claim of a patent document comprising a set of claim limitations; and
      wherein a claim limitation of the set of claim limitations is configured as activatable by a user within the user interface;
   receiving an indication that the claim limitation has been activated by the user; and
   in response to receiving the indication:
      querying the patent reference database to retrieve the intrinsic evidence for the claim limitation; and
      presenting the retrieved intrinsic evidence in the user interface.

2. The method of claim 1, wherein presenting the retrieved intrinsic evidence comprises:
   presenting a popup menu containing a plurality of references defining a term contained in the claim limitation.

3. The method of claim 2, further comprising:
   presenting the popup menu in response to a hover input over the claim limitation.

4. The method of claim 2, further comprising:
   receiving a selection of a reference one of the plurality of references; and
   presenting a portion of the reference relevant to the claim limitation in a second popup window.

5. The method of claim 1, wherein presenting the retrieved intrinsic evidence comprises:
   displaying a portion of a specification of the patent document in which the activated claim limitation appears.

6. The method of claim 1, wherein presenting a user interface comprises:
   segmenting the user interface into at least two portions including a first portion and a second portion, wherein the first portion is configured to display the claim limitation and the second portion is configured to display the intrinsic evidence.

7. The method of claim 1, further comprising:
   before presenting the retrieved intrinsic evidence, displaying a popup menu including an option to display intrinsic evidence for the claim limitation and an option to present extrinsic evidence for the claim limitation; and
   presenting the retrieved intrinsic evidence is response to receiving an indication that the option to present the intrinsic evidence was selected.

8. A non-transitory computer-readable medium comprising instructions, which when executed by at least one processor, configure the at least one process to perform operations, the operations comprising:
   maintaining a patent reference database, the patent reference database storing a plurality of patent records, wherein a respective patent record identifies intrinsic evidence for claim limitations of claims of the respective patent record;

presenting a user interface comprising:
a patent claim of a patent document comprising a set of claim limitations; and
wherein a claim limitation of the set of claim limitations is configured as activatable by a user within the user interface;
receiving an indication that the claim limitation has been activated by the user; and
in response to receiving the indication:
querying the patent reference database to retrieve the intrinsic evidence for the claim limitation; and
presenting the retrieved intrinsic evidence in the user interface.

9. The non-transitory computer-readable medium of claim 8, wherein presenting the retrieved intrinsic evidence comprises:
presenting a popup menu containing a plurality of references defining a term contained in the claim limitation.

10. The non-transitory computer-readable medium of claim 9, wherein the at least one processor is further configured to perform operations, which when executed by the at least one processor, comprising:
presenting the popup menu in response to a hover input over the claim limitation.

11. The non-transitory computer-readable medium of claim 9 wherein the at least one processor is further configured to perform operations, which when executed by the at least one processor, comprising:
receiving a selection of a reference one of the plurality of references; and
presenting a portion of the reference relevant to the claim limitation in a second popup window.

12. The non-transitory computer-readable medium of claim 8, wherein presenting the retrieved intrinsic evidence comprises:
displaying a portion of the specification of the patent document in which the activated claim limitation appears.

13. The non-transitory computer-readable medium of claim 8, wherein presenting a user interface comprises:
segmenting the user interface into at least two portions including a first portion and a second portion, wherein the first portion is configured to display the claim limitation and the second portion is configured to display the intrinsic evidence.

14. The non-transitory computer-readable medium of claim 8, wherein the at least one processor is further configured to perform operations, which when executed by the at least one processor, comprising:
before presenting the retrieved intrinsic evidence, displaying a popup menu including an option to display intrinsic evidence for the claim limitation and an option to present extrinsic evidence for the claim limitation; and
presenting the retrieved intrinsic evidence is response to receiving an indication that the option to present the intrinsic evidence was selected.

15. A system comprising:
at least one processor;
a patent reference database, the patent reference database storing a plurality of patent records, wherein a respective patent record identifies intrinsic evidence for claim limitations of claims of the respective patent record;
a storage device comprising instructions, which when the instructions are executed by the at least one processor, cause the at least one processor to:
present a user interface comprising:
a patent claim of a patent document comprising a set of claim limitations; and
wherein a claim limitation of the set of claim limitations is configured as activatable by a user within the user interface;
receive an indication that the claim limitation has been activated by the user; and
in response to receiving the indication:
query the patent reference database to retrieve the intrinsic evidence for the claim limitation; and
present the retrieved intrinsic evidence in the user interface.

16. The system of claim 15, wherein presenting the retrieved intrinsic evidence comprises:
presenting a popup menu containing a plurality of references defining a term contained in the claim limitation.

17. The system of claim 16, further comprising:
presenting the popup menu in response to a hover input over the claim limitation.

18. The system of claim 16, further comprising:
receiving a selection of a reference one of the plurality of references; and
presenting a portion of the reference relevant to the claim limitation in a second popup window.

19. The system of claim 15, wherein presenting the retrieved intrinsic evidence comprises:
displaying a portion of the specification of the patent document in which the activated claim limitation appears.

20. The system of claim 15, wherein presenting a user interface comprises:
segmenting the user interface into at least two portions including a first portion and a second portion, wherein the first portion is configured to display the claim limitation and the second portion is configured to display the intrinsic evidence.

* * * * *